US012203436B2

(12) United States Patent
Strang et al.

(10) Patent No.: US 12,203,436 B2
(45) Date of Patent: Jan. 21, 2025

(54) VEHICLE HEATER AND CONTROLS THEREFOR

(71) Applicant: Marine Canada Acquisition Inc., Richmond (CA)

(72) Inventors: Kenneth Strang, Coquitlam (CA); Bruce Wilnechenko, Burnaby (CA); Korbin Thomas, Langley (CA); Daine Strankman, Red Deer (CA)

(73) Assignee: Dometic Marine Canada Inc., Richmond (CA)

( * ) Notice: Subject to any disclaimer, the term of this patent is extended or adjusted under 35 U.S.C. 154(b) by 0 days.

(21) Appl. No.: 17/732,748

(22) Filed: Apr. 29, 2022

(65) Prior Publication Data

US 2023/0009411 A1 Jan. 12, 2023

Related U.S. Application Data

(63) Continuation of application No. 16/089,320, filed as application No. PCT/CA2017/050391 on Mar. 30, 2017, now Pat. No. 11,319,916.

(Continued)

(51) Int. Cl.

*F02N 19/10* (2010.01)
*F23D 11/10* (2006.01)

(Continued)

(52) U.S. Cl.

CPC .............. *F02N 19/10* (2013.01); *F23D 11/10* (2013.01); *F23N 5/006* (2013.01); *F23N 5/26* (2013.01);

(Continued)

(58) Field of Classification Search

CPC .......... F02N 19/10; F23D 11/10; F23N 5/006; F24H 9/1836; F01P 2060/18

(Continued)

(56) References Cited

U.S. PATENT DOCUMENTS 3,963,407 A 6/1976 Kofink
3,986,665 A 10/1976 Kofink et al.

(Continued)

FOREIGN PATENT DOCUMENTS

CA 2872307 C 9/2018
DE 4243712 C1 6/1994

(Continued)

OTHER PUBLICATIONS

Extended European Search Report mailed Oct. 18, 2021 from corresponding European Patent Application No. EP21176569.8; 8 pages.

(Continued)

*Primary Examiner* — Lindsay M Low
*Assistant Examiner* — Omar Morales
(74) *Attorney, Agent, or Firm* — CALDERON SAFRAN & WRIGHT P.C.

(57) ABSTRACT

A heater comprises a combustion chamber and a jacket extending about the combustion chamber. There is a fan having an output which communicates with the combustion chamber to provide combustion air. There is also a fuel delivery system having a variable delivery rate. A burner assembly is connected to the combustion chamber. The burner assembly has a burner mounted thereon adjacent the combustion chamber. The burner receives fuel from the fuel delivery system. There is an exhaust system extending from the combustion chamber. An oxygen sensor is positioned in the exhaust system to detect oxygen content of exhaust gases. There is a control system operatively coupled to the oxygen sensor and the fuel delivery system. The control system controls the delivery rate of the fuel delivery system according to the oxygen content of the exhaust gases.

20 Claims, 27 Drawing Sheets

Related U.S. Application Data

(60) Provisional application No. 62/315,527, filed on Mar. 30, 2016.

(51) Int. Cl.
*F23N 5/00* (2006.01)
*F23N 5/26* (2006.01)
*F24H 1/00* (2022.01)
*F24H 9/1836* (2022.01)

(52) U.S. Cl.
CPC ............ *F23N 5/265* (2013.01); *F24H 1/009* (2013.01); *F24H 9/1836* (2013.01); *F01P 2060/18* (2013.01); *F23D 2900/21002* (2013.01); *F23N 2239/06* (2020.01); *F23N 2241/14* (2020.01)

(58) Field of Classification Search
USPC .................................... 123/142.5 R, 142.5 E
See application file for complete search history.

(56) References Cited

U.S. PATENT DOCUMENTS

| | | | | |
|---|---|---|---|---|
| 4,010,895 | A | | 3/1977 | Kofink et al. |
| 4,015,912 | A | | 4/1977 | Kofink |
| 4,077,215 | A | | 3/1978 | Reams et al. |
| 4,115,050 | A | | 9/1978 | Gerwin |
| 4,126,410 | A | | 11/1978 | Gerwin |
| 4,162,888 | A | | 7/1979 | Weishaupt et al. |
| 4,314,797 | A | | 2/1982 | Gerwin |
| 4,365,477 | A | | 12/1982 | Pearce |
| 4,439,138 | A | | 3/1984 | Craig et al. |
| 4,536,151 | A | | 8/1985 | Langen et al. |
| 4,568,266 | A | | 2/1986 | Bonne |
| 4,573,320 | A | | 3/1986 | Kralick |
| 4,595,356 | A | | 6/1986 | Gaysert et al. |
| 4,599,052 | A | | 7/1986 | Langen et al. |
| 4,608,013 | A | | 8/1986 | Gaysert et al. |
| 4,633,667 | A | | 1/1987 | Watanabe et al. |
| 4,650,415 | A | | 3/1987 | Langen et al. |
| 4,669,973 | A | | 6/1987 | Langen et al. |
| 4,718,602 | A | | 1/1988 | Beck et al. |
| 4,732,322 | A | | 3/1988 | Gaysert et al. |
| 4,773,847 | A | | 9/1988 | Shukla et al. |
| 4,787,537 | A | | 11/1988 | Hau |
| 4,815,966 | A | | 3/1989 | Janssen |
| 4,818,219 | A | | 4/1989 | Widemann et al. |
| 4,860,951 | A | | 8/1989 | Waas |
| 4,931,011 | A | | 6/1990 | Reiser et al. |
| 4,934,907 | A | | 6/1990 | Kroner |
| 4,936,341 | A | | 6/1990 | Mayer |
| 4,944,153 | A | | 7/1990 | Goerlich et al. |
| 4,944,661 | A | | 7/1990 | Mayer |
| 4,958,491 | A | | 9/1990 | Wirth et al. |
| 4,984,736 | A | | 1/1991 | Reiser et al. |
| 4,991,396 | A | | 2/1991 | Goerlich et al. |
| 4,992,021 | A | | 2/1991 | Langen et al. |
| 5,018,490 | A | | 5/1991 | Kroner |
| 5,020,991 | A | | 6/1991 | Schaale et al. |
| 5,022,851 | A | | 6/1991 | Reiser et al. |
| 5,033,957 | A | | 7/1991 | Gerstmann et al. |
| 5,037,292 | A | | 8/1991 | Steiert |
| 5,044,158 | A | | 9/1991 | Goerlich |
| 5,046,663 | A | | 9/1991 | Bittmann |
| 5,048,752 | A | | 9/1991 | Hintennach et al. |
| 5,060,855 | A | | 10/1991 | Mohring et al. |
| 5,078,317 | A | | 1/1992 | Kenner et al. |
| 5,082,175 | A | | 1/1992 | Koch et al. |
| 5,090,896 | A | | 2/1992 | Kenner et al. |
| 5,097,813 | A | | 3/1992 | Reiser et al. |
| 5,110,286 | A | | 5/1992 | Gaysert et al. |
| 5,123,594 | A | | 6/1992 | Humburg |
| 5,137,444 | A | | 8/1992 | Grebe et al. |
| 5,172,857 | A | | 12/1992 | Mohring et al. |
| 5,174,254 | A | | 12/1992 | Humburg |
| 5,194,718 | A | | 3/1993 | Reiser et al. |
| 5,211,333 | A | | 5/1993 | Schmalenbach et al. |
| 5,232,153 | A | | 8/1993 | Mohring et al. |
| 5,253,806 | A | | 10/1993 | Gaysert et al. |
| 5,299,554 | A | | 4/1994 | Mohring |
| 5,365,865 | A | | 11/1994 | Monro |
| 5,366,151 | A | | 11/1994 | King et al. |
| 5,413,279 | A | | 5/1995 | Quaas et al. |
| 5,449,288 | A | | 9/1995 | Bass |
| 5,456,079 | A | | 10/1995 | Langen |
| 5,527,180 | A | | 6/1996 | Robinson et al. |
| 5,546,701 | A | | 8/1996 | Greiner et al. |
| 5,564,627 | A | | 10/1996 | Veitenhansl |
| 5,584,653 | A | | 12/1996 | Frank et al. |
| 5,586,721 | A | | 12/1996 | Humburg |
| 5,588,592 | A | | 12/1996 | Wilson |
| 5,605,453 | A | | 2/1997 | Kenner et al. |
| 5,660,329 | A | | 8/1997 | Humburg |
| 5,667,376 | A | | 9/1997 | Robertson et al. |
| 5,702,055 | A | | 12/1997 | Humburg |
| 5,707,008 | A | | 1/1998 | Eppler et al. |
| 5,707,227 | A | | 1/1998 | Angen et al. |
| 5,727,730 | A | | 3/1998 | Habijanec et al. |
| 5,732,880 | A | | 3/1998 | Langen et al. |
| 5,743,466 | A | | 4/1998 | Humburg |
| 5,749,516 | A | | 5/1998 | Humburg |
| 5,788,148 | A | | 8/1998 | Burner et al. |
| 5,788,150 | A | | 8/1998 | Bittmann |
| 5,796,332 | A | | 8/1998 | Steiert |
| 5,816,793 | A | | 10/1998 | Nakamoto et al. |
| 5,823,155 | A | | 10/1998 | Burner |
| 5,826,428 | A | | 10/1998 | Blaschke |
| 5,847,671 | A | | 12/1998 | Sailer et al. |
| 5,855,319 | A | | 1/1999 | Burner et al. |
| 5,871,033 | A | | 2/1999 | Keinert et al. |
| 5,893,710 | A | | 4/1999 | Brenner |
| 5,894,988 | A | | 4/1999 | Brenner et al. |
| 5,918,803 | A | | 7/1999 | Pfister et al. |
| 5,938,423 | A | * | 8/1999 | Nishiyama ............. F23N 5/006 431/12 |
| 5,938,429 | A | | 8/1999 | Brenner |
| 5,947,717 | A | | 9/1999 | Steiner et al. |
| 5,974,803 | A | | 11/1999 | Hammerschmid |
| 5,983,841 | A | | 11/1999 | Haber |
| 5,988,156 | A | | 11/1999 | Schmid et al. |
| 5,993,197 | A | | 11/1999 | Alber et al. |
| 6,006,997 | A | | 12/1999 | Pfister et al. |
| 6,012,646 | A | * | 1/2000 | Young .................... F23D 11/28 239/126 |
| 6,021,752 | A | | 2/2000 | Wahle et al. |
| 6,027,334 | A | | 2/2000 | Blaschke |
| 6,034,352 | A | | 3/2000 | Gortler et al. |
| 6,071,071 | A | | 6/2000 | Mohring |
| 6,085,738 | A | * | 7/2000 | Robinson ............... F23D 11/10 126/360.1 |
| 6,089,465 | A | | 7/2000 | Habijanec et al. |
| 6,102,687 | A | | 8/2000 | Butcher et al. |
| 6,106,282 | A | | 8/2000 | Humburg et al. |
| 6,142,728 | A | | 11/2000 | Humburg et al. |
| 6,161,506 | A | | 12/2000 | Hanson |
| 6,164,554 | A | | 12/2000 | Pfister et al. |
| 6,243,532 | B1 | | 6/2001 | Wacker et al. |
| 6,364,212 | B1 | | 4/2002 | Widemann |
| 6,422,190 | B1 | | 7/2002 | Gortler et al. |
| 6,431,459 | B1 | | 8/2002 | Humburg |
| 6,474,697 | B2 | | 11/2002 | Nording et al. |
| 6,540,150 | B1 | | 4/2003 | Eberspach et al. |
| 6,540,151 | B1 | | 4/2003 | Steiner et al. |
| 6,638,031 | B1 | | 10/2003 | Humburg |
| 6,660,359 | B1 | | 12/2003 | Wirth et al. |
| 6,664,627 | B2 | | 12/2003 | Cheon |
| 6,681,889 | B2 | | 1/2004 | Collmer et al. |
| 6,695,037 | B1 | | 2/2004 | Humburg et al. |
| 6,702,189 | B2 | | 3/2004 | Debio |
| 6,702,191 | B2 | | 3/2004 | Schmidbartl et al. |
| 6,712,282 | B2 | | 3/2004 | Eberspach et al. |
| 6,712,283 | B2 | | 3/2004 | Humburg |
| 6,722,862 | B2 | | 4/2004 | Hartnagel et al. |

(56) References Cited

U.S. PATENT DOCUMENTS

| | | | |
|---|---|---|---|
| 6,724,983 | B1 | 4/2004 | Humburg et al. |
| 6,726,114 | B2 | 4/2004 | Blaschke et al. |
| 6,739,148 | B2 | 5/2004 | Humburg |
| 6,739,868 | B2 | 5/2004 | Haefner et al. |
| 6,743,012 | B2 | 6/2004 | Wolf |
| 6,755,622 | B1 | 6/2004 | Hartnagel et al. |
| 6,764,302 | B2 | 7/2004 | Eberspach et al. |
| 6,793,487 | B2 | 9/2004 | Hubbauer et al. |
| 6,811,395 | B2 | 11/2004 | Schlecht |
| 6,871,790 | B2 | 3/2005 | Kaupert et al. |
| 6,883,730 | B2 | 4/2005 | Eberspach et al. |
| 6,902,391 | B2 | 6/2005 | Bauer et al. |
| 6,926,074 | B2 | 8/2005 | Worner |
| 6,926,206 | B2 | 8/2005 | Schlecht et al. |
| 6,929,467 | B2 | 8/2005 | Blaschke et al. |
| 6,932,151 | B2 | 8/2005 | Galtz |
| 6,945,770 | B1 | 9/2005 | Blaschke et al. |
| 6,983,890 | B2 | 1/2006 | Rottler et al. |
| 6,984,170 | B2 | 1/2006 | Schlecht et al. |
| 6,988,885 | B2 | 1/2006 | Blaschke et al. |
| 7,011,179 | B2 | 3/2006 | Wolf et al. |
| 7,060,936 | B2 | 6/2006 | Eberspach |
| 7,093,431 | B2 | 8/2006 | Balle et al. |
| 7,165,513 | B2 | 1/2007 | Humburg |
| 7,168,241 | B2 | 1/2007 | Rudelt et al. |
| 7,195,179 | B2 | 3/2007 | Miller et al. |
| 7,216,812 | B2 | 5/2007 | Eberspach et al. |
| 7,229,279 | B2 | 6/2007 | Wahl et al. |
| 7,258,605 | B2 | 8/2007 | Schlecht et al. |
| 7,322,804 | B2 | 1/2008 | Humburg |
| 7,331,118 | B2 | 2/2008 | Eberspach |
| 7,334,544 | B2 | 2/2008 | Eberspach |
| 7,335,015 | B2 | 2/2008 | Meier |
| 7,335,016 | B2 | 2/2008 | Kramer et al. |
| 7,434,746 | B2 | 10/2008 | Schlecht et al. |
| 8,395,087 | B2 | 3/2013 | Bohlender et al. |
| 8,395,097 | B2 | 3/2013 | Bohlender et al. |
| 8,439,667 | B2 | 5/2013 | Fan et al. |
| 8,637,796 | B2 | 1/2014 | Bohlender |
| 8,660,747 | B2 | 2/2014 | Bolender et al. |
| 8,740,105 | B2 | 6/2014 | Gerhardt et al. |
| 8,769,977 | B2 | 7/2014 | Renner et al. |
| 8,803,036 | B2 | 8/2014 | Niederer et al. |
| 8,807,447 | B2 | 8/2014 | Fiumidinisi |
| 8,910,881 | B2 | 12/2014 | Ludwig |
| 8,919,491 | B2 | 12/2014 | Trumler et al. |
| 8,943,815 | B2 | 2/2015 | Resch |
| 9,012,002 | B2 | 4/2015 | Noak et al. |
| 9,066,168 | B2 | 6/2015 | Peitz et al. |
| 9,119,232 | B2 | 8/2015 | Clauss et al. |
| 9,145,802 | B2 | 9/2015 | Oesterle et al. |
| 9,169,757 | B2 | 10/2015 | Calvo |
| 9,239,001 | B2 | 1/2016 | Birgler et al. |
| 9,273,882 | B2 | 3/2016 | Bohlender et al. |
| 9,283,828 | B2 | 3/2016 | Graubmann et al. |
| 9,291,362 | B2 | 3/2016 | Bohlender et al. |
| 11,319,916 | B2 | 5/2022 | Strang et al. |
| 2003/0150932 | A1 | 8/2003 | Eberspach et al. |
| 2004/0007196 | A1* | 1/2004 | Young .................. B60H 1/2209 123/142.5 R |
| 2004/0244752 | A1* | 12/2004 | Young ..................... F23D 14/34 123/142.5 R |
| 2005/0241319 | A1 | 11/2005 | Graves et al. |
| 2005/0258263 | A1 | 11/2005 | Robinson |
| 2008/0113306 | A1 | 5/2008 | Veasey et al. |
| 2009/0136801 | A1 | 5/2009 | Ohkawara |
| 2013/0108067 | A1 | 5/2013 | Schumacher et al. |
| 2013/0161124 | A1 | 6/2013 | Neumann et al. |
| 2013/0161306 | A1 | 6/2013 | Bohlender et al. |
| 2013/0161307 | A1 | 6/2013 | Bohlender et al. |
| 2013/0161308 | A1 | 6/2013 | Bohlender et al. |
| 2013/0161316 | A1 | 6/2013 | Bohlender et al. |
| 2013/0163969 | A1 | 6/2013 | Bohlender et al. |
| 2013/0186062 | A1 | 7/2013 | Pommerer et al. |
| 2013/0233845 | A1 | 9/2013 | Bohlender et al. |
| 2013/0240289 | A1 | 9/2013 | Schmitt et al. |
| 2013/0277026 | A1 | 10/2013 | Geser |
| 2013/0333359 | A1 | 12/2013 | Resch |
| 2013/0333977 | A1 | 12/2013 | Wirth et al. |
| 2013/0337388 | A1 | 12/2013 | Schwanecke et al. |
| 2014/0000551 | A1 | 1/2014 | Eberspach |
| 2014/0000670 | A1 | 1/2014 | Oesterle et al. |
| 2014/0008449 | A1 | 1/2014 | Eger et al. |
| 2014/0037469 | A1 | 2/2014 | Humburg |
| 2014/0044606 | A1 | 2/2014 | Barthold et al. |
| 2014/0047822 | A1 | 2/2014 | Oesterle et al. |
| 2014/0076292 | A1 | 3/2014 | Gaiser et al. |
| 2014/0076293 | A1 | 3/2014 | Gaiser et al. |
| 2014/0109557 | A1 | 4/2014 | Calvo |
| 2014/0121900 | A1 | 5/2014 | Graubmann et al. |
| 2014/0131461 | A1 | 5/2014 | Humburg |
| 2014/0165558 | A1 | 6/2014 | Birgler et al. |
| 2014/0193759 | A1 | 7/2014 | Weber |
| 2014/0217086 | A1 | 8/2014 | Bytzek |
| 2014/0234792 | A1 | 8/2014 | Brehmer et al. |
| 2014/0319125 | A1 | 10/2014 | Bohlender et al. |
| 2014/0328493 | A1 | 11/2014 | Wirth et al. |
| 2014/0346242 | A1 | 11/2014 | Jozinovic et al. |
| 2014/0360170 | A1 | 12/2014 | Hacklander |
| 2015/0008264 | A1 | 1/2015 | Ilchenko et al. |
| 2015/0013313 | A1 | 1/2015 | Calvo |
| 2015/0014293 | A1 | 1/2015 | Bytzek et al. |
| 2015/0014424 | A1 | 1/2015 | Bytzek et al. |
| 2015/0020762 | A1 | 1/2015 | Peitz et al. |
| 2015/0027428 | A1 | 1/2015 | Ilchenko et al. |
| 2015/0028118 | A1 | 1/2015 | Panterott et al. |
| 2015/0040885 | A1* | 2/2015 | Dell ........................ F23C 7/004 110/317 |
| 2015/0090802 | A1 | 4/2015 | Eckert et al. |
| 2015/0110681 | A1 | 4/2015 | Ferront et al. |
| 2015/0163863 | A1 | 6/2015 | Wegener et al. |
| 2015/0215994 | A1 | 7/2015 | Bohlender et al. |
| 2015/0292460 | A1 | 10/2015 | Kobayashi |
| 2015/0308305 | A1 | 10/2015 | Herta |
| 2015/0315943 | A1 | 11/2015 | Gschwind |
| 2015/0351161 | A1 | 12/2015 | Kramer et al. |
| 2016/0017785 | A1 | 1/2016 | Resch et al. |
| 2016/0169505 | A1 | 6/2016 | Ilchenko et al. |

FOREIGN PATENT DOCUMENTS

| | | | |
|---|---|---|---|
| GB | 392030 | A | 5/1933 |
| WO | WO2003099595 | A1 | 12/2003 |
| WO | WO2013025250 | A1 | 2/2013 |

OTHER PUBLICATIONS

Extended European Search Report mailed Jan. 28, 2020 from corresponding European Patent Application No. EP17772908.4; 9 pages.
Supplemental Partial European Search Report mailed Oct. 4, 2019 from corresponding European Patent Application No. EP17772908.4; 10 pages.

* cited by examiner

VEHICLE HEATER AND CONTROLS THEREFOR

CROSS-REFERENCE TO RELATED APPLICATIONS AND CLAIM TO PRIORITY

This application is a continuation of U.S. patent application Ser. No. 16/089,320 filed Sep. 27, 2018, now U.S. Pat. No. 11,319,916, which was a national stage application of International Application No. PCT/CA2017/050391 filed Mar. 30, 2017, which claims priority to U.S. Provisional Patent Application No. 62/315,527, filed Mar. 30, 2016, which are incorporated herein by reference.

TECHNICAL FIELD

The present disclosure relates to heaters and, in particular, to heaters for heating the coolant of vehicles and to controls therefor.

BACKGROUND

Diesel fired coolant heaters are essentially water heaters. They are typically installed in commercial, industrial and marine applications to preheat engines to facilitate starting in cold weather or to provide comfort heat to the passenger compartments. They burn liquid fuels to generate heat which is then transferred to the coolant system of the target application. Coolant is then circulated throughout the system to deliver the heat to the desired locations and thus transferred to the engine or heat exchangers.

In cold weather, engines can be difficult to start because the oil becomes more viscous, causing increased resistance of the internal moving parts, while cold diesel fuel does not atomize and ignite as readily. Cold engines work inefficiently, resulting in increased wear, decreasing useful engine life. To overcome these issues, heated coolant is circulated through the engine, heating the engine block, internal components and oil within.

In cold weather, when vehicles are stationary, the engines are typically idled to generate heat to keep the engine and passenger compartments warm. Utilization of a coolant heater eliminates the need to idle the engine, thus reducing the overall fuel consumption, corresponding emissions and provides a reduction in engine maintenance. Heat generated by the heater is transferred to the engine directly by circulating coolant through the engine block.

In some cases, newer commercial engines are very efficient but need to operate within specific operating temperatures to ensure proper operation of the emissions control equipment. In some applications, the engine loading is low and thus it never reaches the required operating temperature. Diesel fired coolant heaters are utilized to add heat to the engine to maintain or increase the operating temperatures so that the emissions control equipment operates correctly.

In cold temperatures, hydraulic equipment must be cycled gently until it warms up, otherwise it can be damaged. Heated coolant can be provided to heat hydraulic system reservoirs and equipment to enable faster operation in cold temperatures, reducing potential component life damage.

Heat can also be applied with such heaters to temperature sensitive loads such as cooking grease in rendering trucks or for the transportation of waxes or foodstuffs which may solidify in cold temperatures.

SUMMARY

It is an object of the present invention to provide an improved vehicle heater and controls therefor.

There is accordingly provided a heater for a liquid, the heater comprising a combustion chamber and a jacket for the liquid which extends about the combustion chamber. There is a fan having an output which communicates with the combustion chamber to provide combustion air. There is also a fuel delivery system having a variable delivery rate. A burner assembly is connected to the combustion chamber. The burner assembly has a burner mounted thereon adjacent the combustion chamber. The burner receives fuel from the fuel delivery system. There is an exhaust system extending from the combustion chamber. An oxygen sensor is positioned in the exhaust system to detect oxygen content of exhaust gases. There is a control system operatively coupled to the oxygen sensor and the fuel delivery system. The control system controls the delivery rate of the fuel delivery system according to the oxygen content of the exhaust gases. The oxygen sensor may also detect the presence or absence of a flame by measuring the oxygen content of exhaust gases in the exhaust system.

The control system may provide a closed loop feedback control. The fuel delivery system may include a proportional control valve. The control system may control the delivery rate of the fuel delivery system via the proportional control valve.

The heater may include an air compressor. The burner may have an atomizing nozzle connected to the compressor to receive compressed air therefrom. The nozzle may be connected to the fuel delivery system to receive fuel therefrom. The nozzle may have a disparager assembly. The disparager assembly may include an outer barrel having a threaded inner wall portion and an inner rod having a threaded outer wall portion. The threaded inner wall portion of the outer barrel and the threaded outer wall portion of the inner rod may have different thread pitches.

The fuel delivery system may have a fuel pump and the air compressor may have an electric drive motor. The electric drive motor may be operatively coupled to the fuel pump by a magnetic coupling to power the fuel pump. The magnetic coupling may include a drive cup rotated by the electric drive motor of the compressor. There may be a shaft follower within the drive cup which is connected to the fuel pump by a shaft.

The combustion chamber may have a wall with a plurality of openings extending therethrough. The openings may communicate with the fan to deliver additional air along the combustion chamber. The wall of the combustion chamber may be a double wall. The double wall may include a cylindrical inner wall portion, a cylindrical outer wall portion which extends about and is spaced-apart from the inner wall portion, and a passageway extending between the inner wall portion and the outer wall portion. The passageway may be operatively connected to the fan to receive combustion air therefrom. The plurality of openings may extend through the inner wall portion of the combustion chamber.

The heater may include an air swirler which forces combustion air to swirl prior to entry into the combustion chamber. The air swirler may have radially or axially extending fins.

There may be a first set of spaced-apart fins extending from the combustion chamber to the jacket to promote heat transfer therebetween. The first set of spaced-apart fins may comprise a plurality of axially and radially extending fins. There may be a second set of spaced-apart fins extending from the combustion chamber to the jacket and from near a first end of the combustion chamber partway towards a second end of the combustion chamber. The second set of spaced-apart fins may also comprise a plurality of axially and radially extending fins. Each of the fins of the second set of spaced-apart fins may be disposed between two adjacent fins of the first set of fins.

The jacket of the heater may include a first temperature sensor and a second temperature sensor. The control system may detect the presence or absence of a flame by comparing a temperature of the liquid at the first temperature sensor and a temperature of the liquid at the second temperature sensor.

DESCRIPTION OF EMBODIMENTS

Figure 1:
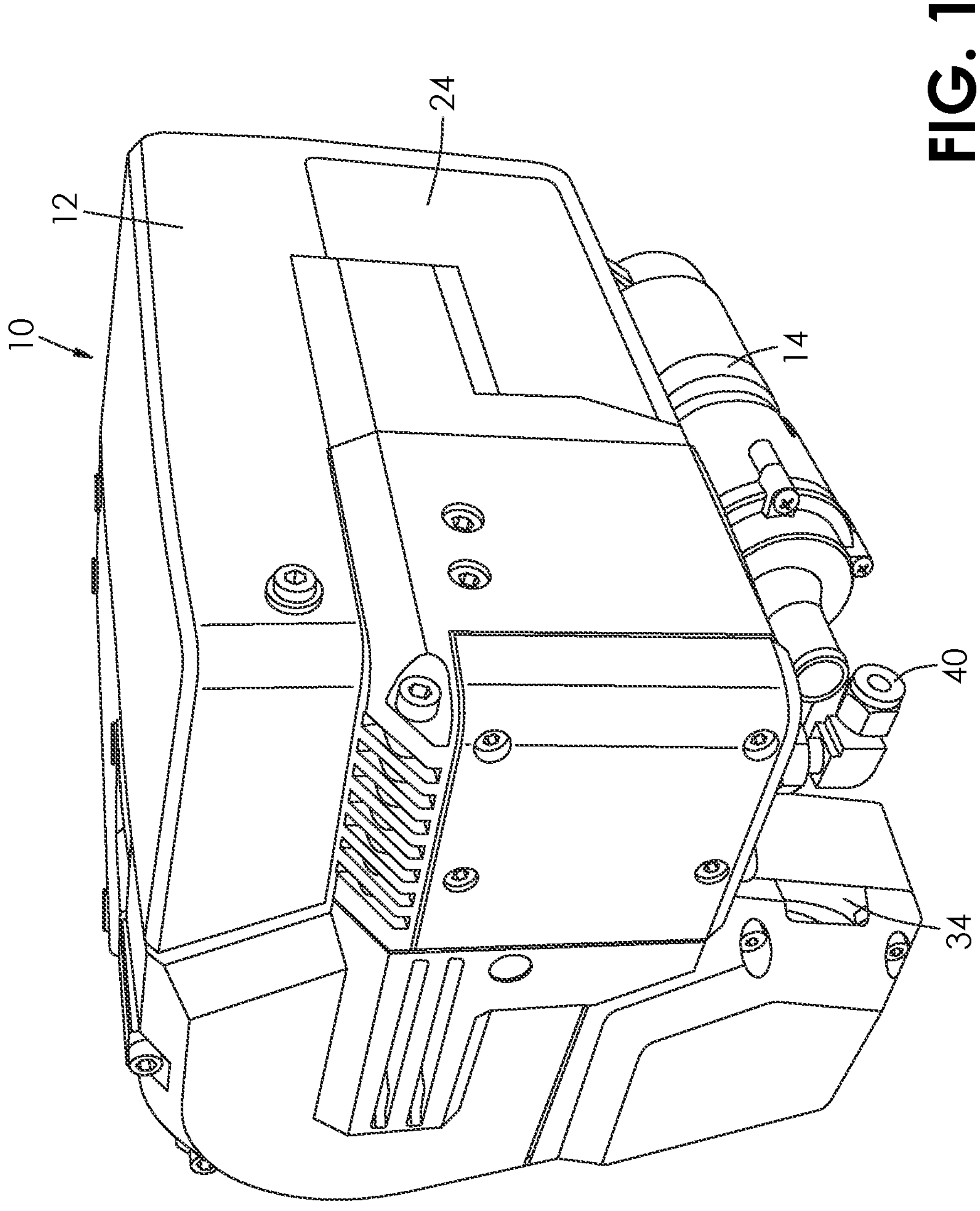
FIG. 1 is a front, side perspective view of a vehicle heater.
Figure 2:
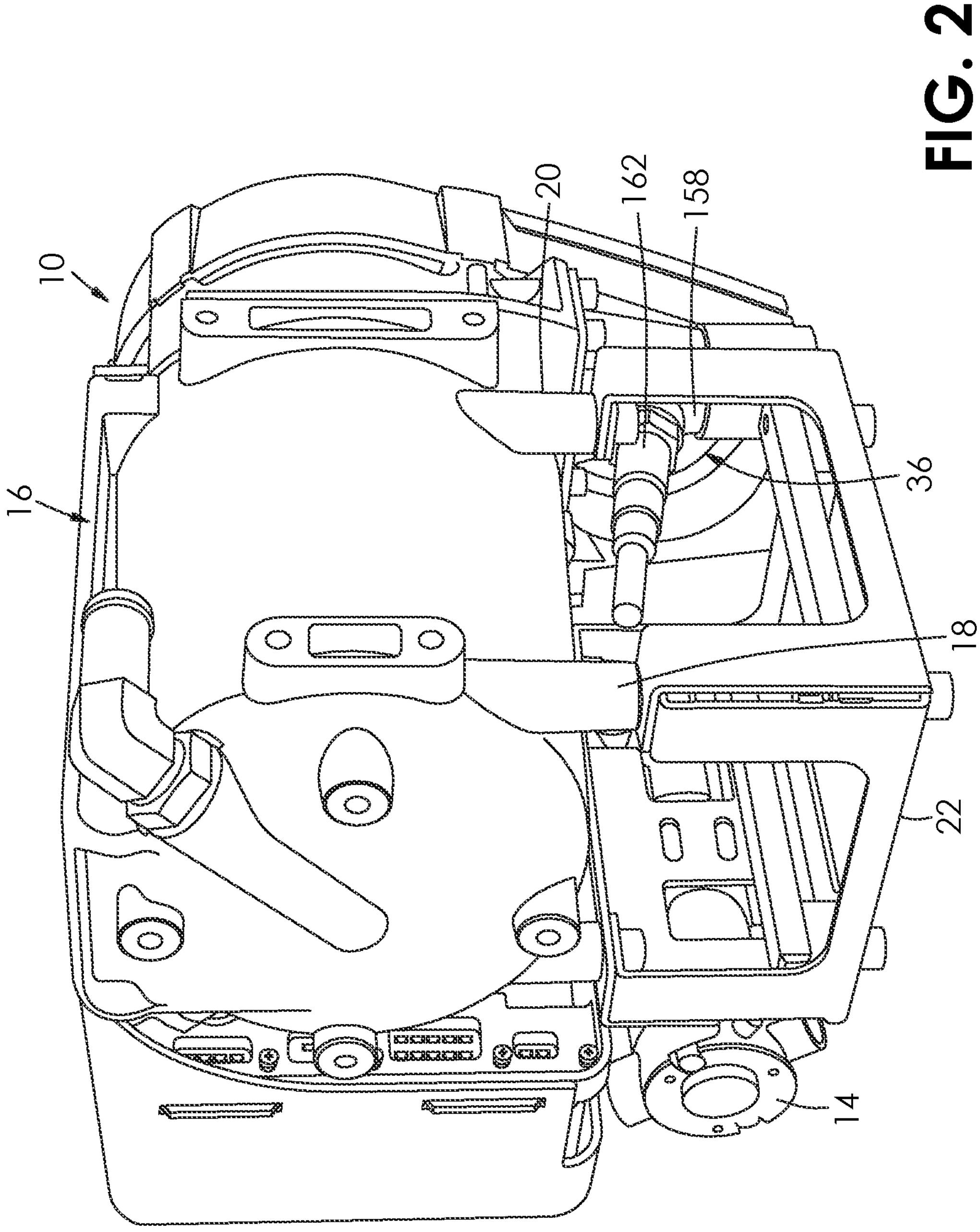
FIG. 2 is a rear, side perspective view of the heater of FIG. 1.
Figure 3:
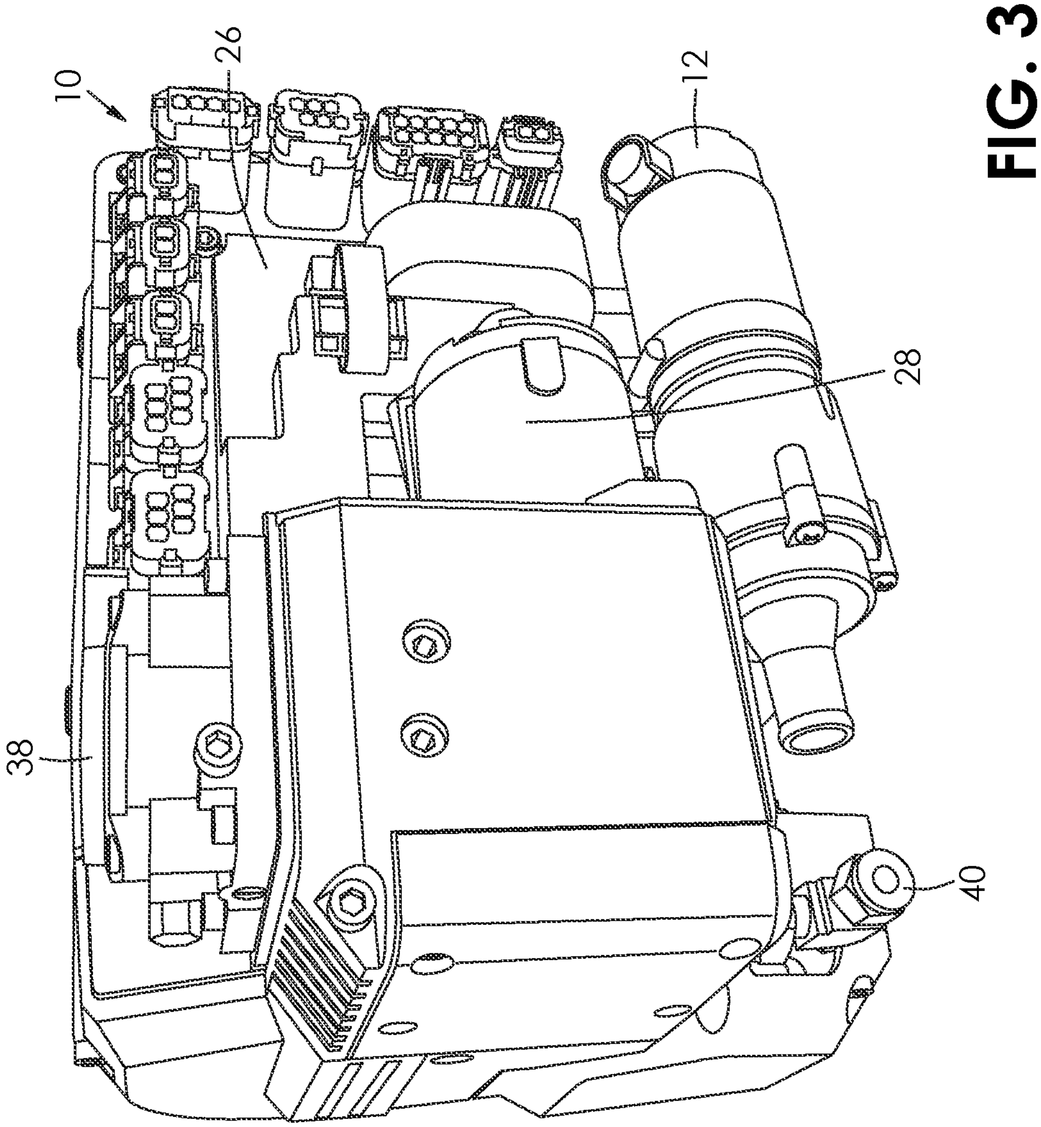
FIG. 3 is a front, side perspective view of the heater of FIG. 1 with an exterior panel removed to show control components thereof.
Figure 4:
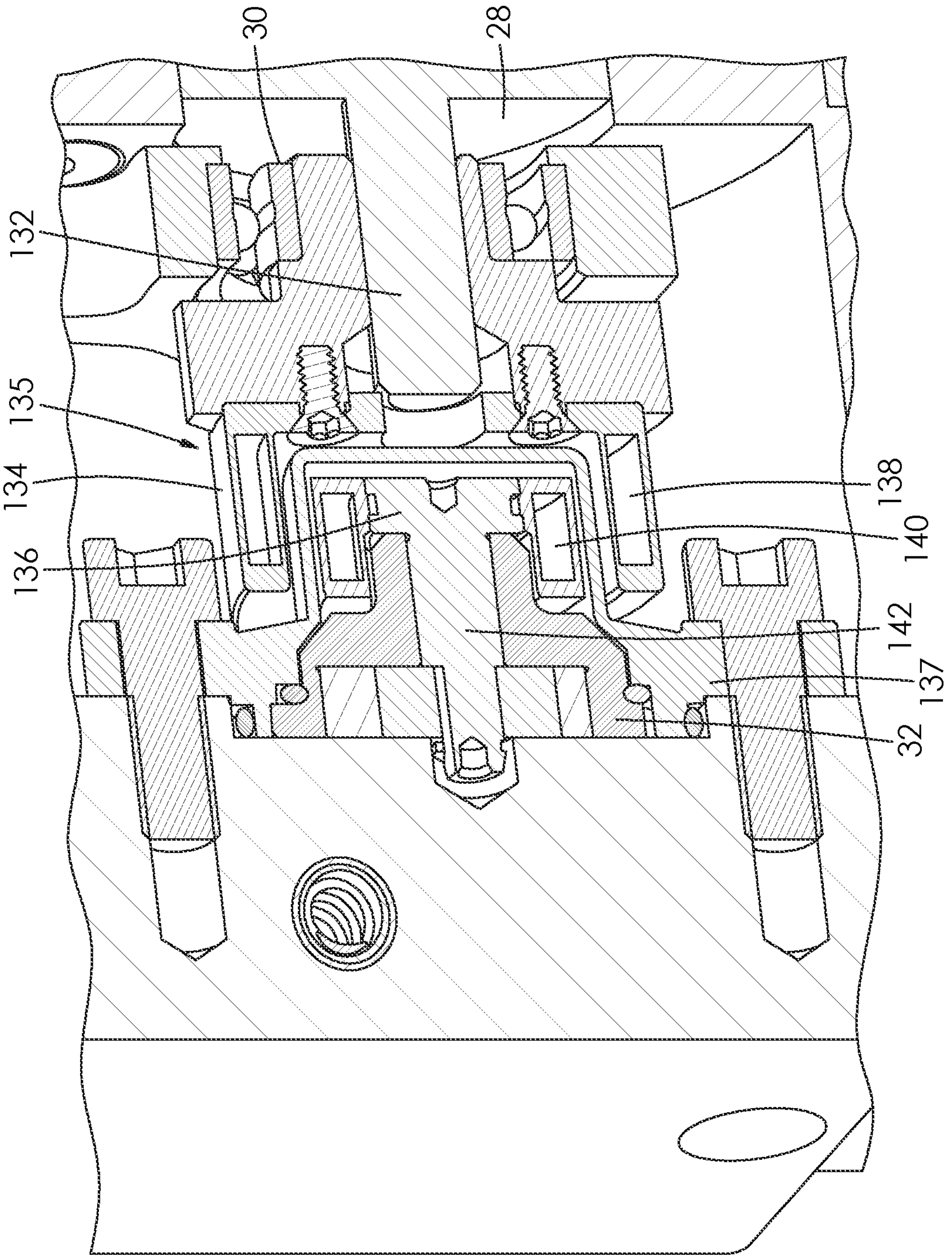
FIG. 4 is a fragmentary, cross-sectional view of a magnetic coupling for coupling a fuel pump and an air compressor to their common motor.
Figure 5:
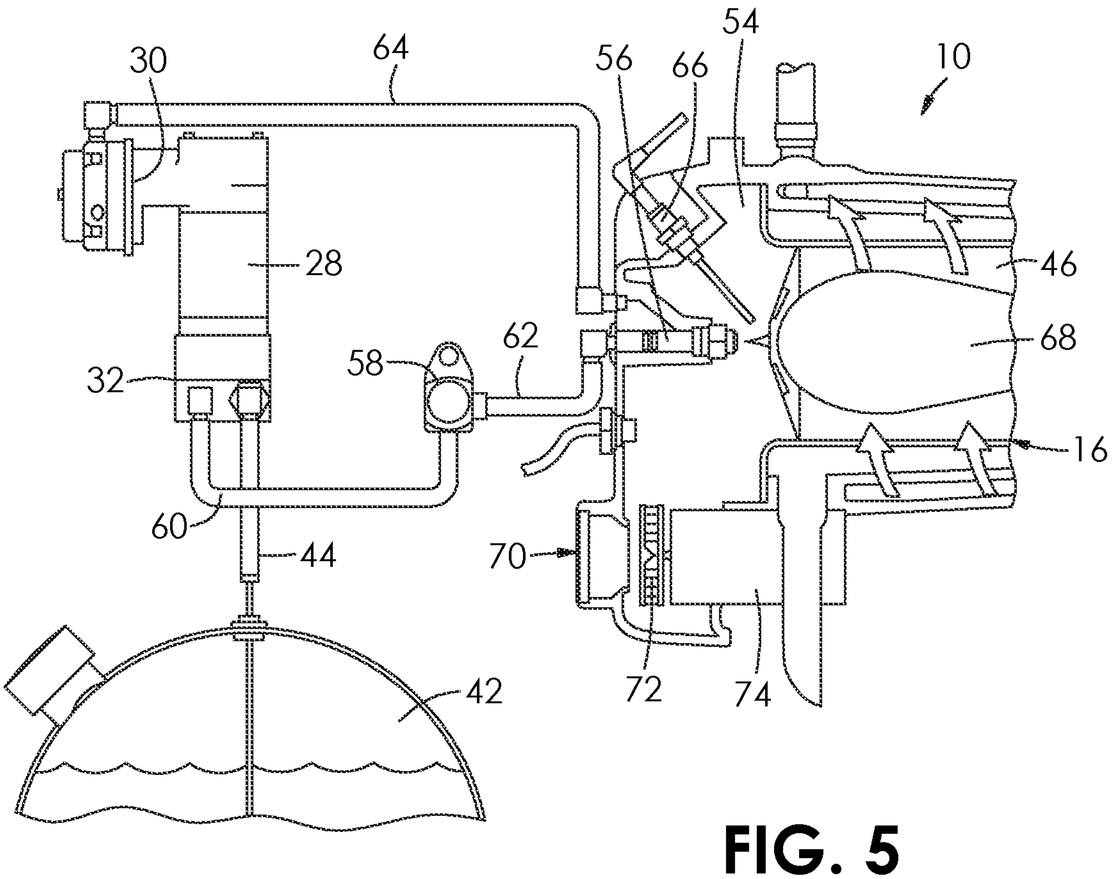
FIG. 5 is a fragmentary, partially schematic view of a fuel system, ignition system and burner head of the heater of FIG. 1.

Referring to the drawings and first to FIGS. 1 and 2, there is shown a vehicle heater 10. The heater 10 includes a housing 12, a pump which in this example is a coolant pump 14, and a heat exchanger 16. The heat exchanger 16 has a plurality of legs, for example, legs 18 and 20 shown in FIG. 2 for mounting the heat exchanger on a support frame 22. The housing 12 includes a controller cover 24 which covers a controller 26 shown in FIG. 3. There is also a motor which in this example is an electric motor 28. The electric motor 28 powers an air compressor 30 and a fuel pump 32, both of which are shown in FIG. 4. Referring back to FIGS. 1 and 2, the heater 10 further includes an air intake 34 which receives combustion air for the heater and an exhaust system 36 which discharges exhaust gases from the heater. There is also an air filter 38 shown in FIG. 3. The heater 10 further includes a fuel line connector 40 for connecting the heater to a fuel tank 42 of a vehicle via a fuel line 44 as shown in FIG. 5.

Figure 6:
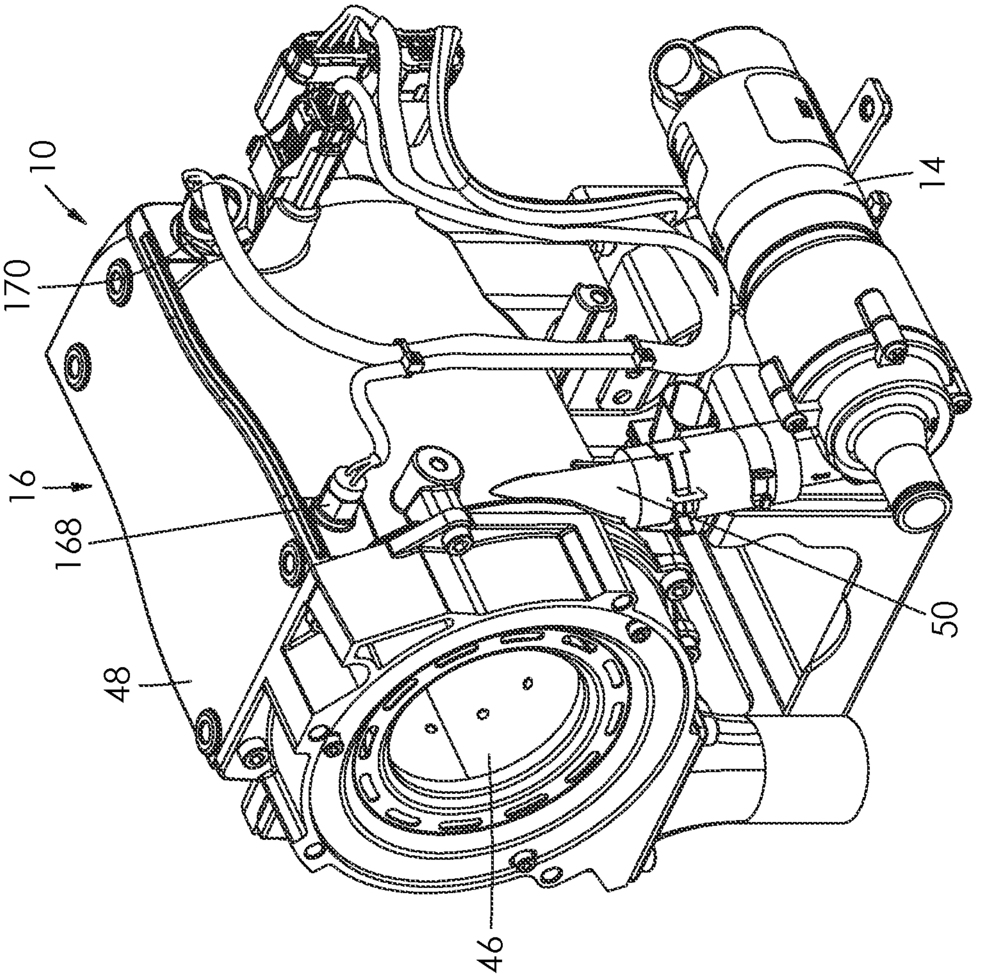
FIG. 6 is a front, perspective view of the heater of FIG. 1 with a burner head thereof removed.
Figure 7:
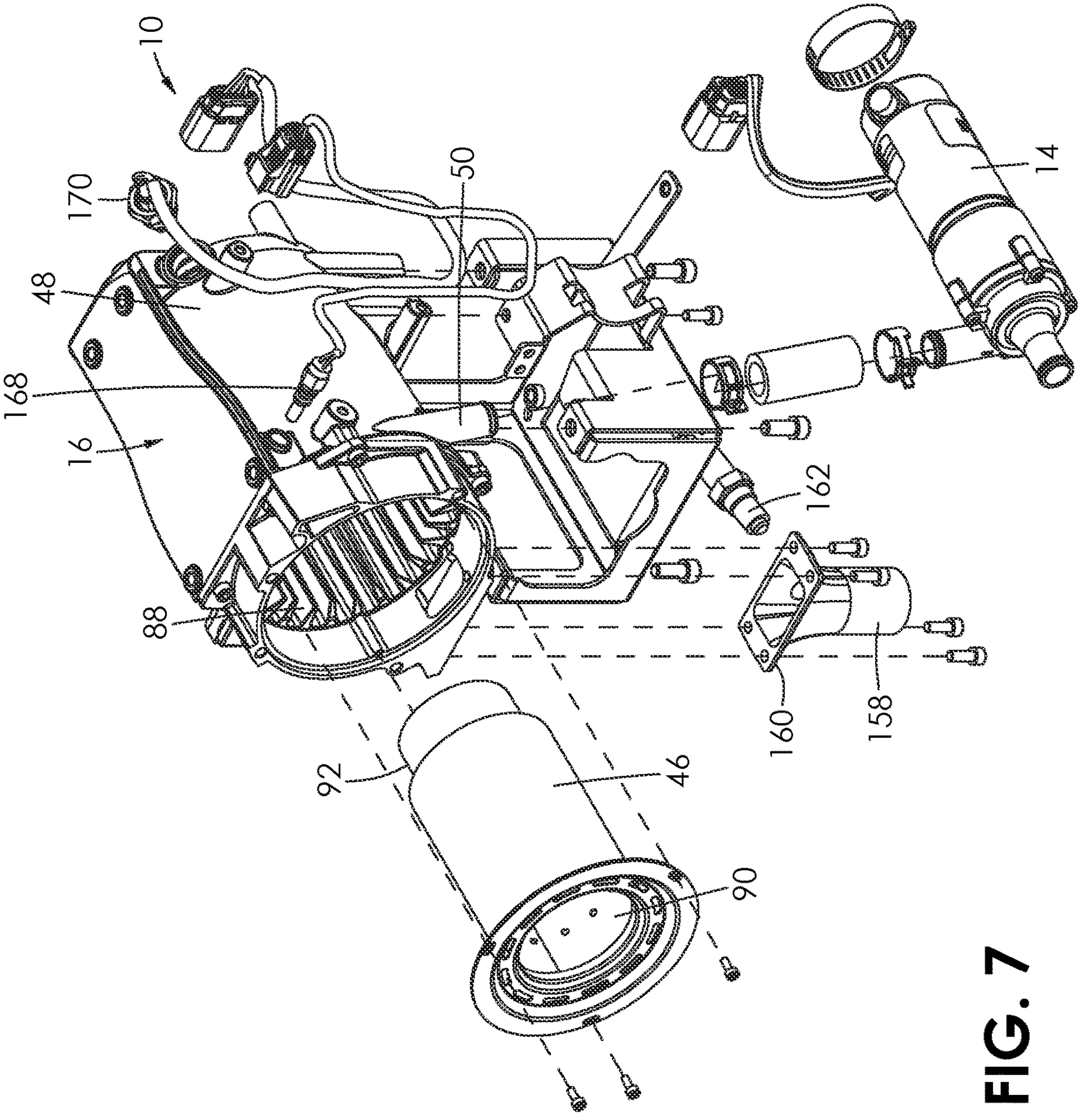
FIG. 7 is an exploded view of the heater of FIG. 1 with the burner head removed.

As best shown in FIGS. 6 and 7, the heat exchanger 16 includes a cylindrical combustion chamber 46 and an outer jacket extending about the combustion chamber, which in this example is a coolant jacket 48. The coolant pump 14 circulates a liquid, which in this example is engine coolant, through the heat exchanger 16 in order to heat the coolant. In particular, the coolant is fed through the coolant jacket 48 of the heat exchanger 16 via a conduit 50. The coolant is then heated by combustion of fuel in the combustion chamber 46. The coolant may be a mixture of water and antifreeze.

Referring back to FIG. 5, there is a burner head 54 mounted on an end of the combustion chamber 46. The burner head 54 has a nozzle 56 which in this example is a two fluid siphon-type air atomizing nozzle. Fuel from the tank 42 is drawn into the fuel pump 32 via the fuel line 44. The fuel is then discharged from the fuel pump 32 towards a fuel control valve, which in this example is a proportional control valve 58, via a conduit 60. The fuel is then provided to the nozzle 56 via a conduit 62. The nozzle 56 utilizes compressed air received from the air compressor 30 via a conduit 64 to break up the fuel and deliver a highly atomized spray of fuel into the combustion chamber 46. An igniter 66 ignites the atomized fuel to produce a flame 68. Combustion air for the combustion reaction is supplied to the combustion chamber 46 by a blower assembly 70 which includes a blower 72 and a blower motor 74 for powering the blower. The heat generated by the combustion reaction is transferred to the coolant flowing through the heat exchanger 16 and then circulated throughout the vehicle coolant system.

Figure 10:
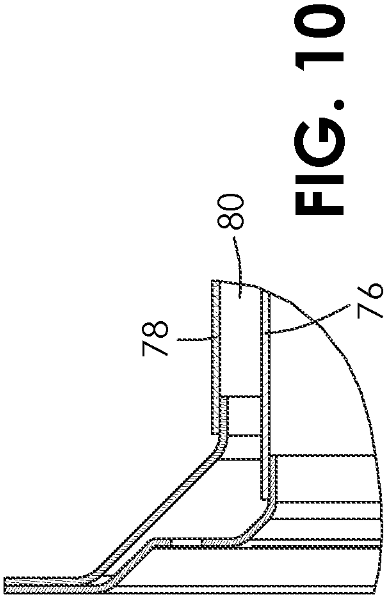
FIG. 10 is a fragmentary, side cross-sectional view of the combustion chamber of the heater of FIG. 1.
Figure 9:
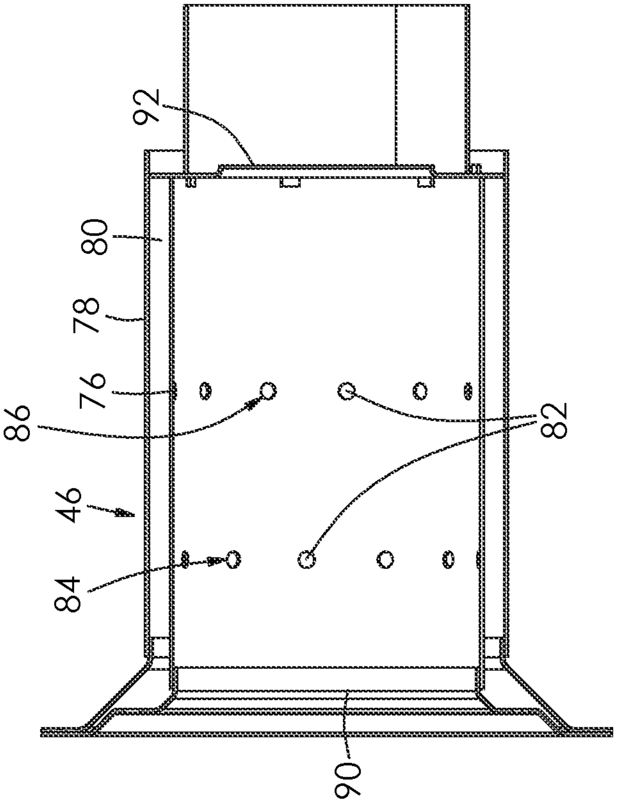
FIG. 9 is a cross-sectional view of the combustion chamber taken along line 9-9 of FIG. 8.
Figure 8:
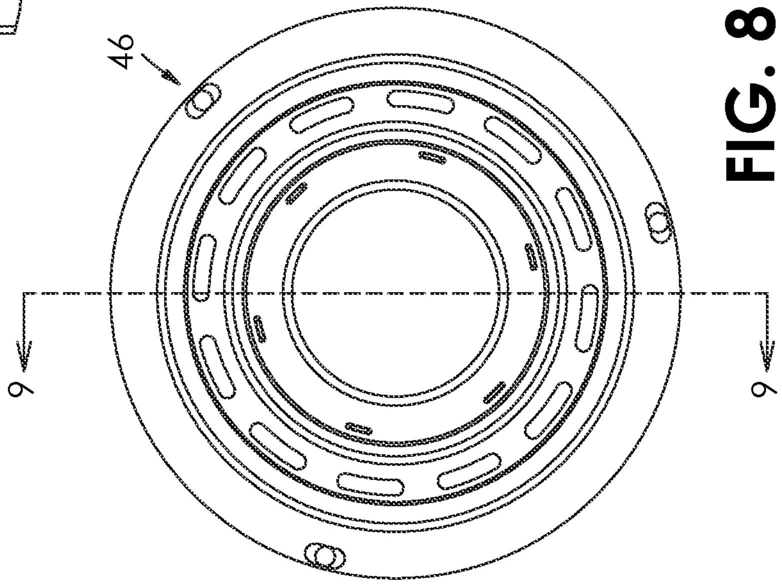
FIG. 8 is a front view of a combustion chamber of the heater of FIG. 1.

As best shown in FIGS. 8 to 10, the combustion chamber 46 in this example has a double wall formed by a cylindrical inner wall portion 76 and a cylindrical outer wall portion 78. The cylindrical inner wall portion 76 and the cylindrical outer wall portion 78 are spaced apart from each other by an annular space 80 which provides a passageway between the wall portions. A plurality of apertures 82 extends through the inner wall portion 76 and communicates with the space 80. In this example, the apertures 82 are arranged in spaced-apart, annular rows 84 and 86 which extend circumferentially about the inner wall portion 76. The apertures 82 permit air to enter the combustion chamber 46 from the space 80.

Referring back to FIG. 7, there is a first set of fins 88 extending radially inwardly from the coolant jacket 48 to the combustion chamber 46. The fins 88 facilitate the transfer of heat from the combustion chamber 46 to the coolant jacket 48 and thus the coolant flowing through the coolant jacket. In this example, the fins 88 comprise a single, cylindrical member which is annular in profile. The cylindrical member is an aluminum casting in this example but may be of other metals formed in ways other than casting. The fins 88 extend from near a first end 90 of the combustion chamber 46 to a position near a second end 92 of the combustion chamber 46. In this example, each of the fins 88 tapers in profile from the second end 92 of the combustion chamber 46 to the first end 90 thereof. Accordingly, the fins 88 are thinner near the first end 90 of the combustion chamber 46 than near the second end 92 of the combustion chamber 46. The fins 88 are also spaced further apart from adjacent fins near the first end 90 of the combustion chamber 46 than near the second end 92 thereof. This is caused by using a single annular casting for the fins 88 in order to facilitate removal of the casting from a mould. However, the result is that the spacing between the fins 88 is less optimal near the first end 90 of the combustion chamber 46.

Figure 11:
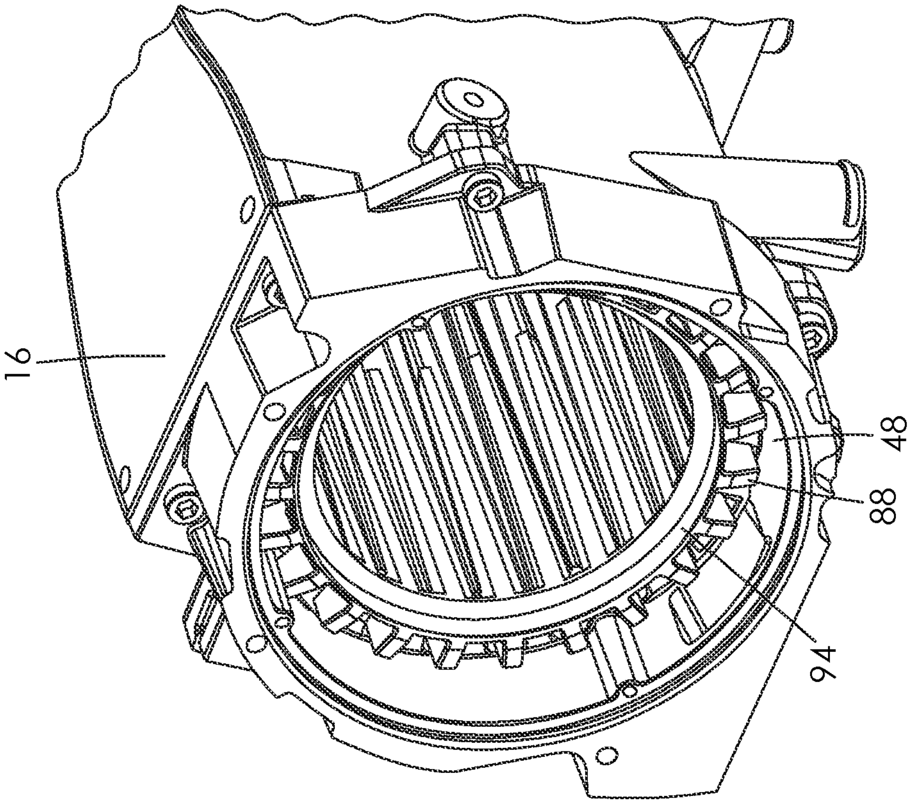
FIG. 11 is a fragmentary, front perspective view of a heat exchanger of the heater of FIG. 1 showing fins extending from the combustion chamber to a coolant jacket thereof.
Figure 12:
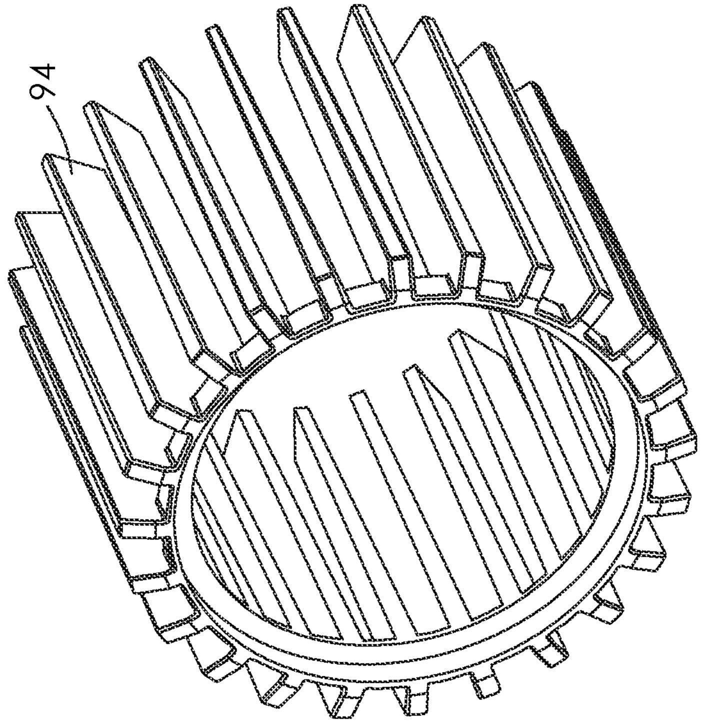
FIG. 12 is a front, side perspective view of one set of the fins of FIG. 11.

Referring now to FIGS. 11 and 12, there is a second set of fins 94 which extends from a position near the first end 90 of the combustion chamber 46 part way towards the second end 92 thereof. In this example, the fins 94 also comprise a single, cylindrical member which is annular in profile and of aluminum casting as best shown in FIG. 12. However, the fins 94 may also be of other materials and be in other configurations in other examples. Each of the fins 96 is positioned between two adjacent fins of the first set of fins 88 to reduce spacing between the fins of the set of fins 88 and accordingly optimize heat transfer between the combustion chamber 46 and the coolant jacket 48.

Figure 13:
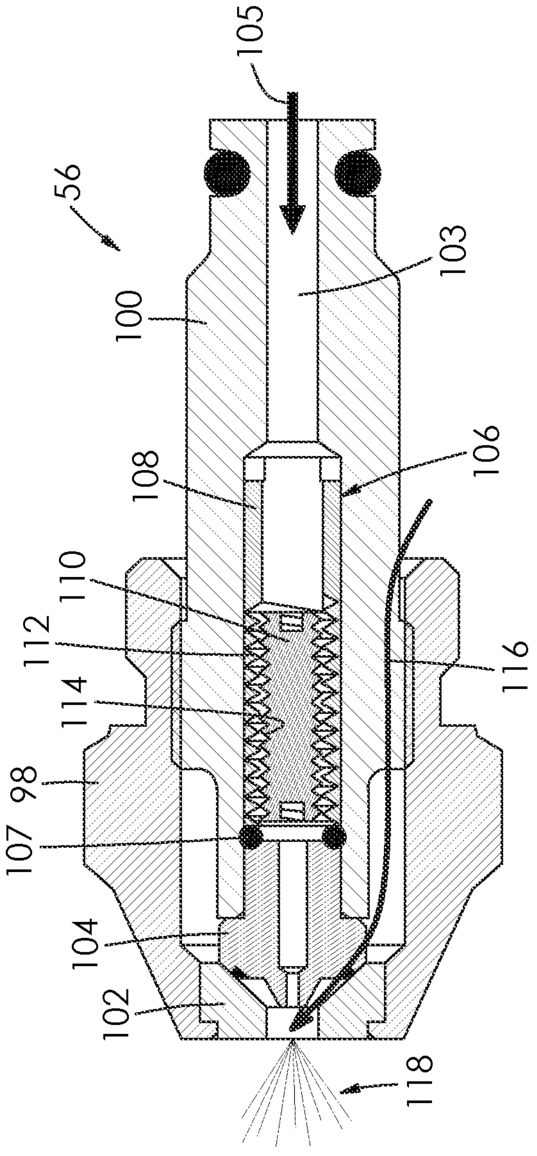
FIG. 13 is a side cross-sectional view of a nozzle of the heater of FIG. 1.

The nozzle 56 is shown in greater detail in FIG. 13 and includes a hex body 98, a stem 100, a cap 102 and a distributor 104. The stem 100 has an axial bore 103 through which fuel from the fuel tank 42, shown in FIG. 5, flows in the direction indicated by arrow 105. Referring back to FIG. 13, there is also a disparager assembly 106 and a seal in the form of an O-ring 107 which is disposed between the disparager assembly 106 and the distributor 104. The disparager assembly 106 includes an outer barrel 108 and an inner rod 110 which are concentric with each other. The outer barrel 108 has a threaded inner wall portion 112 and the inner rod 110 has a threaded outer wall 114. The threaded inner wall portion 112 of the outer barrel 108 and the threaded outer wall 114 of the inner rod 110 have different thread pitches which creates a torturous flow path for the fuel as it flows through the disparager assembly 106. This disrupts the flow of gas bubbles within the fuel stream, thereby breaking up larger gas bubbles into smaller gas bubbles prior to passing into the distributor 104. The sizes of the gas bubbles are sufficiently reduced after passing through the disparager assembly 106 to avoid disrupting the fuel flow to the combustion chamber 46. Otherwise, the combustion process may be interrupted which may cause the heater 10 to stumble or flame out. Compressed air supplied from the air compressor 30, shown in FIG. 5, flows through the nozzle 56 as indicated by arrow 116 in FIG. 13 and interacts with the fuel, causing the fuel to break up into an atomized spray 118 consisting of small droplets of fuel. The small droplets of fuel are evaporated by the heat of combustion and form a combustible gas which, when mixed well with air, is burned in the combustion chamber 46 shown in FIG. 5. The degree of atomization of the fuel is dependent upon the supplied air pressure from the air compressor 30.

Figure 14:
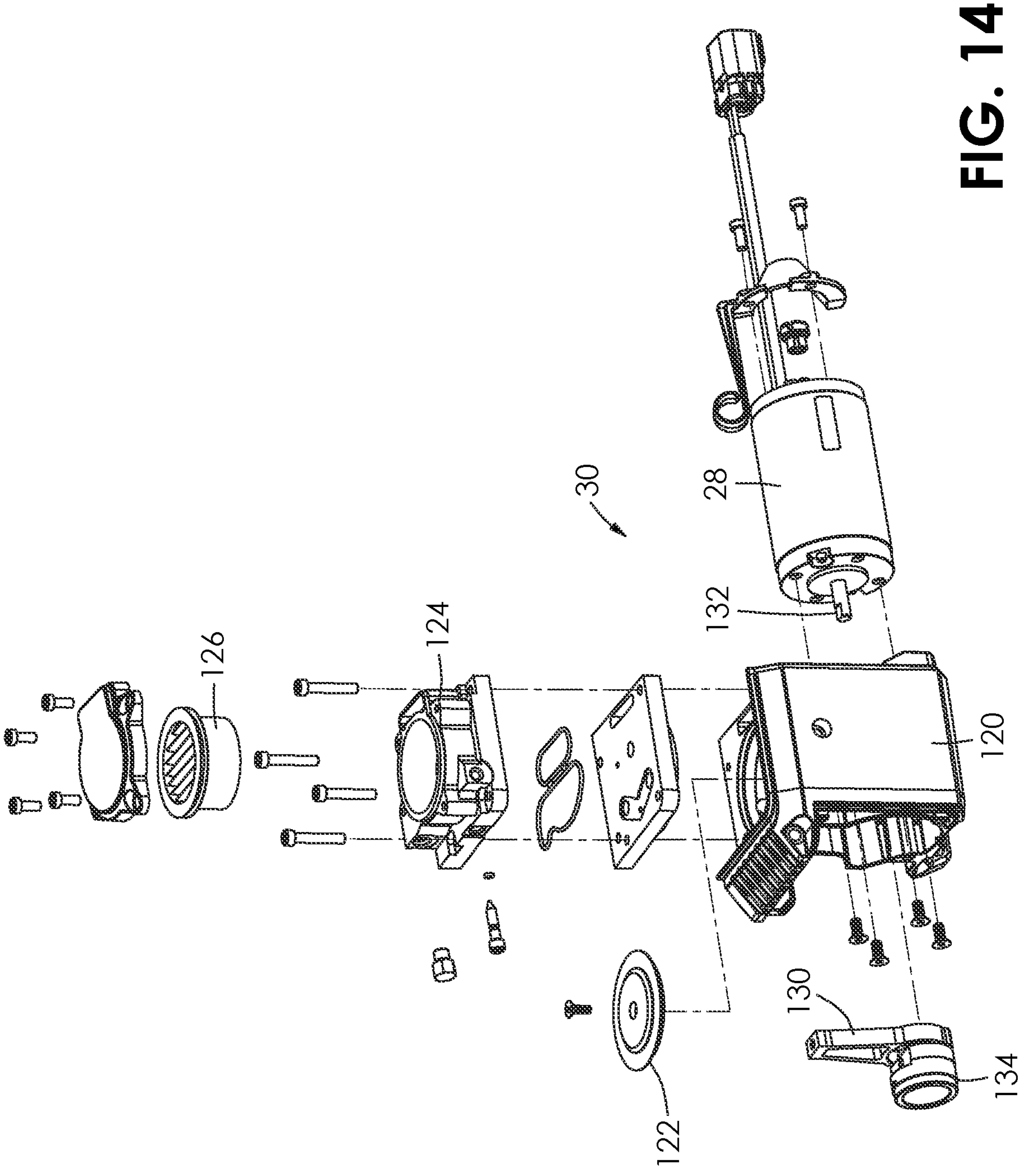
FIG. 14 is an exploded view of the air compressor of the heater of FIG. 1.
Figure 15B:
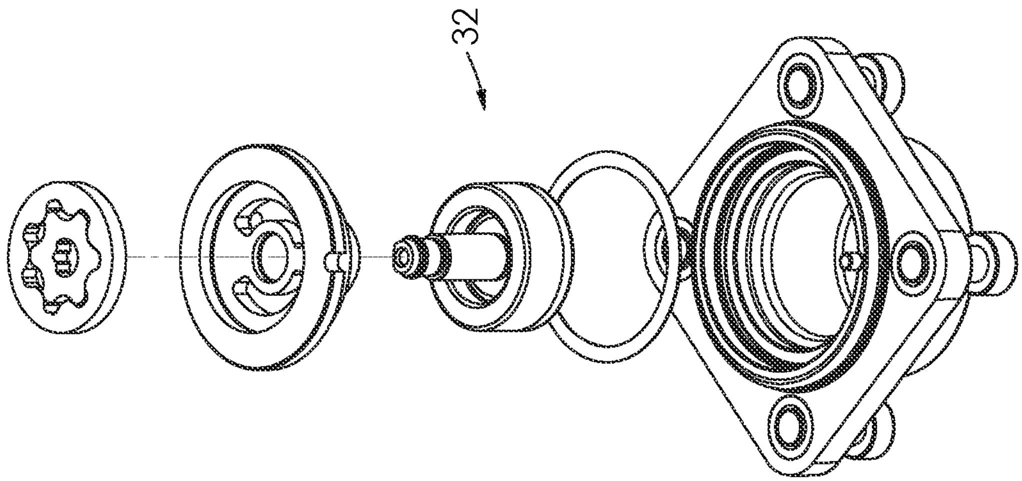
FIG. 15B is an exploded view of the fuel pump of the heater of FIG. 1.
Figure 15A:
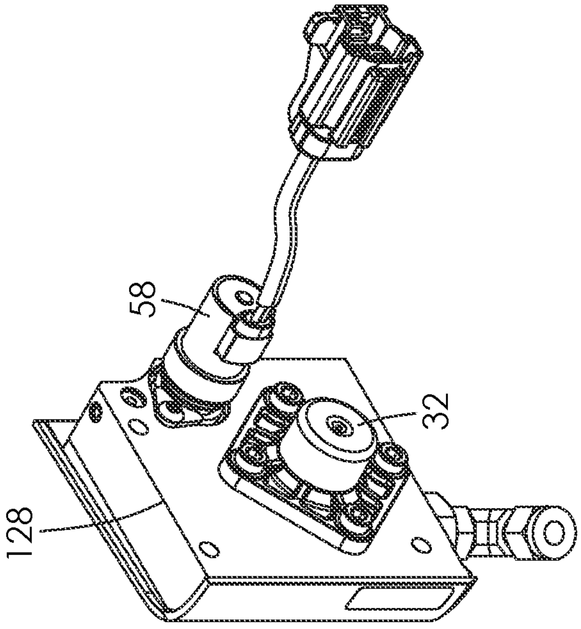
FIG. 15A is a perspective view of a fuel pump of the heater of FIG. 1.

The air compressor 30 is shown in greater detail in FIG. 14 and includes an air compressor housing 120, a diaphragm 122, a cylinder head 124 and an air filter 126. Referring now to FIGS. 15A and 15B, the fuel pump 32 is shown in greater detail. The fuel pump 32 is a gerotor pump in this example but may be a different type of pump such as a gear pump in other examples. The fuel pump 32 is mounted on a fuel pump housing 128 together with the proportional control valve 58. The fuel pump 32 has a connecting rod assembly 130, shown in FIG. 14, which is connected to the electric motor 28.

As shown in FIG. 4, the electric motor 28 has an output shaft 132 which drives both the air compressor 30 and the fuel pump 32. In this example, the electric motor 28 drives the air compressor 30 and the fuel pump 32 simultaneously at the same speed. The output shaft 132 is provided with a moulded drive cup 134 which forms part of a magnetic coupling 135 with a cylindrical, moulded shaft follower 136 received within the drive cup 134. The drive cup 134 has internal magnets 138 in an annular wall thereof and the shaft follower 136 has magnets 140 in an annular wall thereof. A shaft 142 of the shaft follower 136 is connected to the fuel pump 32. When the output shaft 132 of the electric motor 28 rotates, the drive cup 134 rotates the shaft follower 136 which cause its shaft 142 to rotate the fuel pump 32. There is also a moulded separator cup 137 located between the electric motor 28 and the fuel pump 32. The separator cup 137 contains the fuel within the fuel pump 32 while magnetically transferring the rotational torque to drive the fuel pump. This eliminates the need for a dynamic shaft seal on the fuel pump which reduces the potential for fuel leaks. The output pressure of the fuel pump 32 remains constant throughout the RPM range of the pump.

Figure 16:
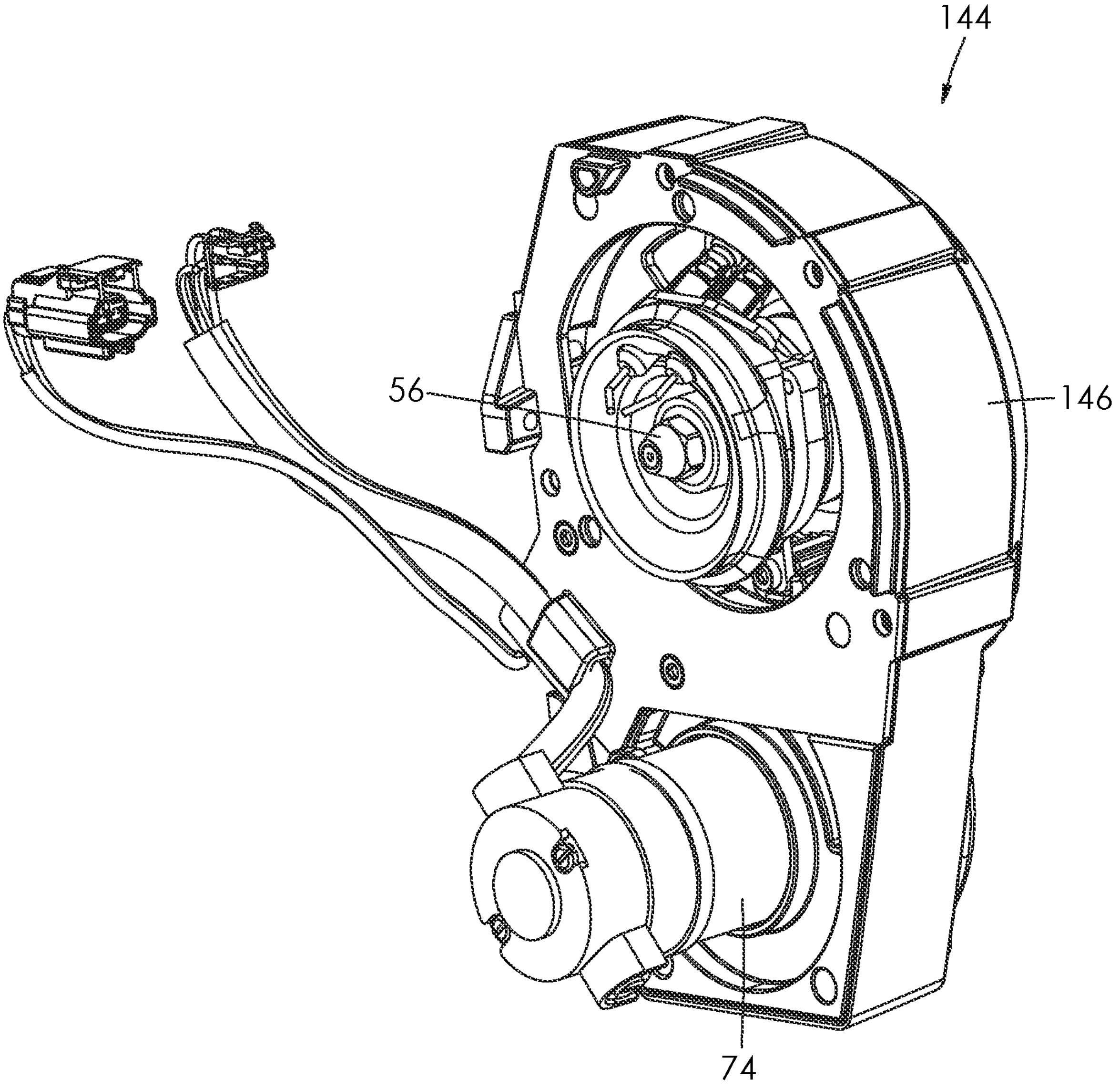
FIG. 16 is a perspective view of an assembled fan assembly of the heater of FIG. 1.
Figure 17:
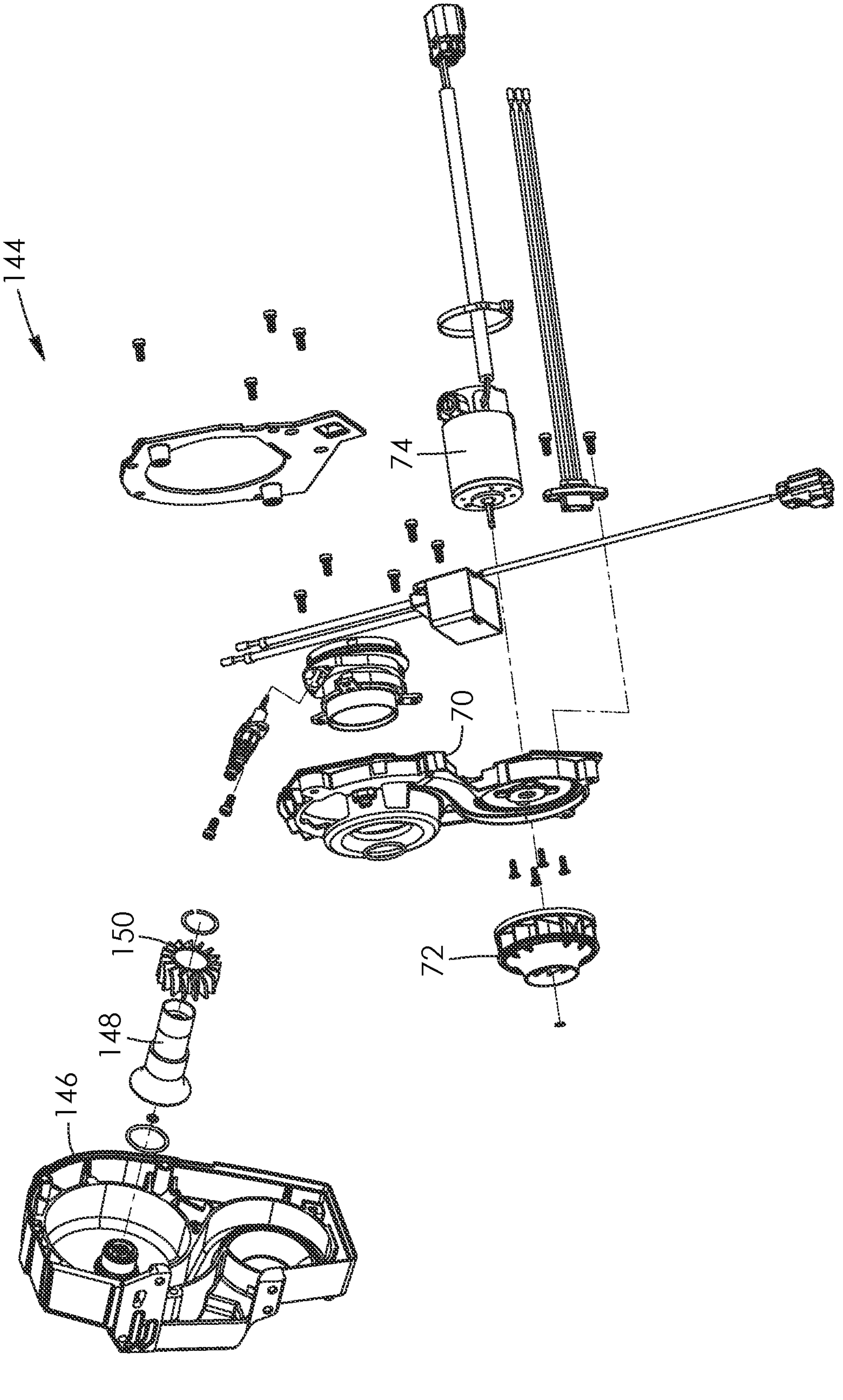
FIG. 17 is an exploded view of the fan assembly of FIG. 16.
Figure 18:
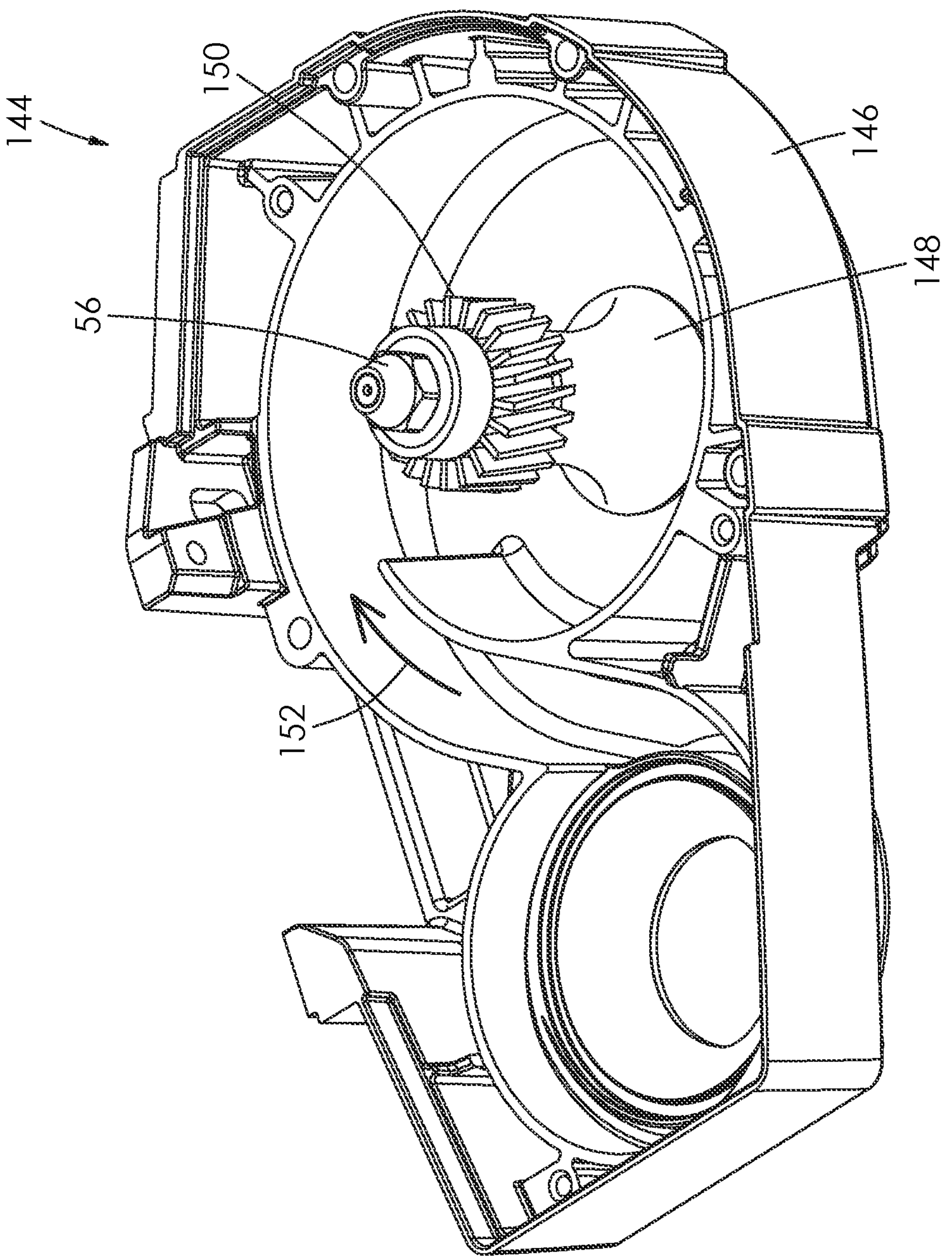
FIG. 18 is a perspective view of the fan assembly showing an air swirler thereof.
Figure 19:
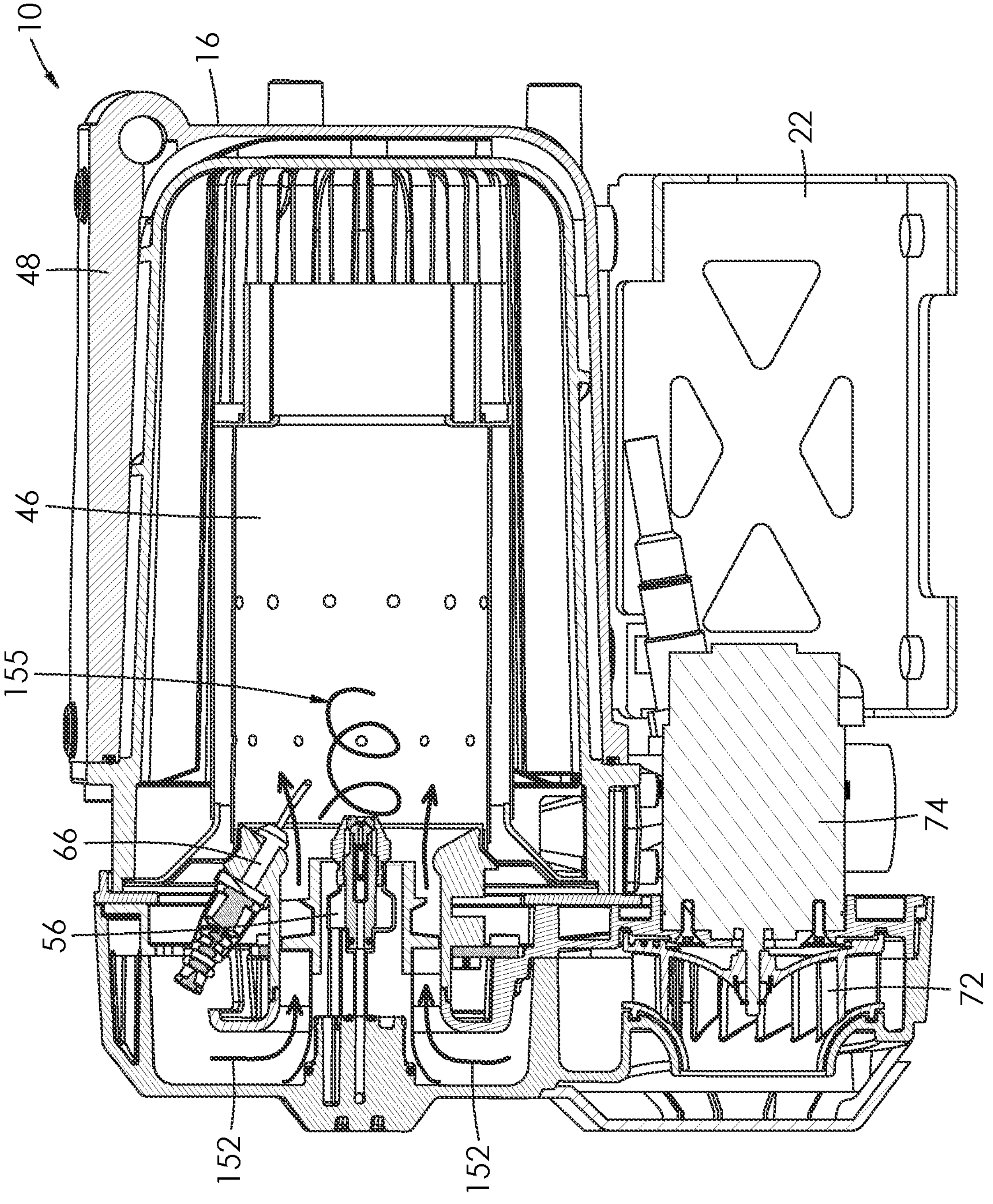
FIG. 19 is a side cross-sectional view of the heater of FIG. 1 showing the flow of combustion air through the air swirler of FIG. 18.

FIGS. 16 and 17 shows a fan assembly 144 which provides combustion air for the heater 10. The fan assembly 144 includes a fan housing 146 which receives the blower assembly 70 including the blower 72 and the blower motor 74. The fan assembly 144 further includes a cylindrical sleeve 148 and an air swirler 150 which is mounted on the cylindrical sleeve as best shown in FIG. 18. The sleeve 148 is adapted to receive the nozzle 56. The air swirler 150 has fins which extend radially outwardly from the sleeve 148. The air swirler 150 is located in the path of the combustion air supply indicated by arrow 152 and forces the combustion air to swirl prior to entry into the combustion chamber 46 as shown in FIG. 19. The swirling air 155 interacts with the atomized fuel spray 118, shown in FIG. 20, causing the air and the fuel to mix. The swirling air also creates a vortex which creates a recirculation in the combustion chamber 46, causing the hot gases of combustion to interact with the new air/fuel mixture delivery. The internal recirculation zone created by the swirling air results in low velocity regions which anchor the flame. This improves mixing and flame stabilization which results in a shorter, more compact flame and lower nitric oxides.

Figure 20:
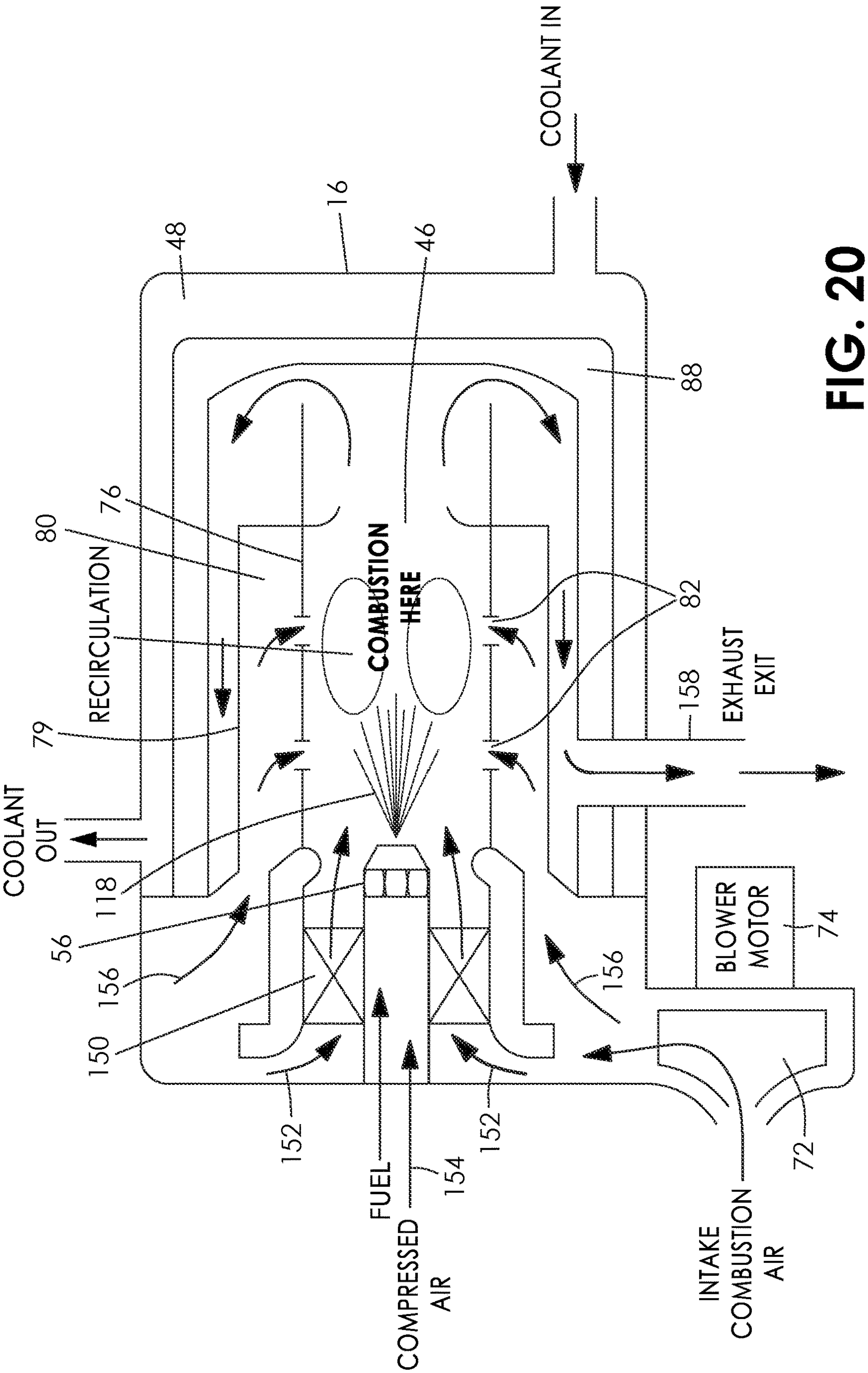
FIG. 20 is a simplified, partially schematic view of the heat exchanger of the heater of FIG. 1 showing paths of combustion air and exhaust gases.

As shown in FIG. 20, there are three air passages for the delivery of combustion air to the combustion chamber 46. The majority of the combustion air (approximately 70%) is delivered through the air swirler 150 as indicated by arrows 152. Approximately 10% of the combustion air is atomized air supplied from the air compressor 30 which flows through the atomizing nozzle 56 as indicated by arrow 154 to break up the fuel into droplets. The balance of the combustion air (approximately 20%) is routed through the annular space 80 between the double wall of the combustion chamber 46 and delivered downstream in the combustion chamber as indicated by arrows 156. This secondary air supply supplements the primary swirled air supply in conjunction with the baffle at the end of the combustion chamber 46 to further enhance the recirculation within the combustion chamber. The baffle and the plurality of apertures 82 in the inner wall portion 76 promote recirculation of combustion gases with the new air/fuel mixture, resulting in improved combustion.

Figure 21:
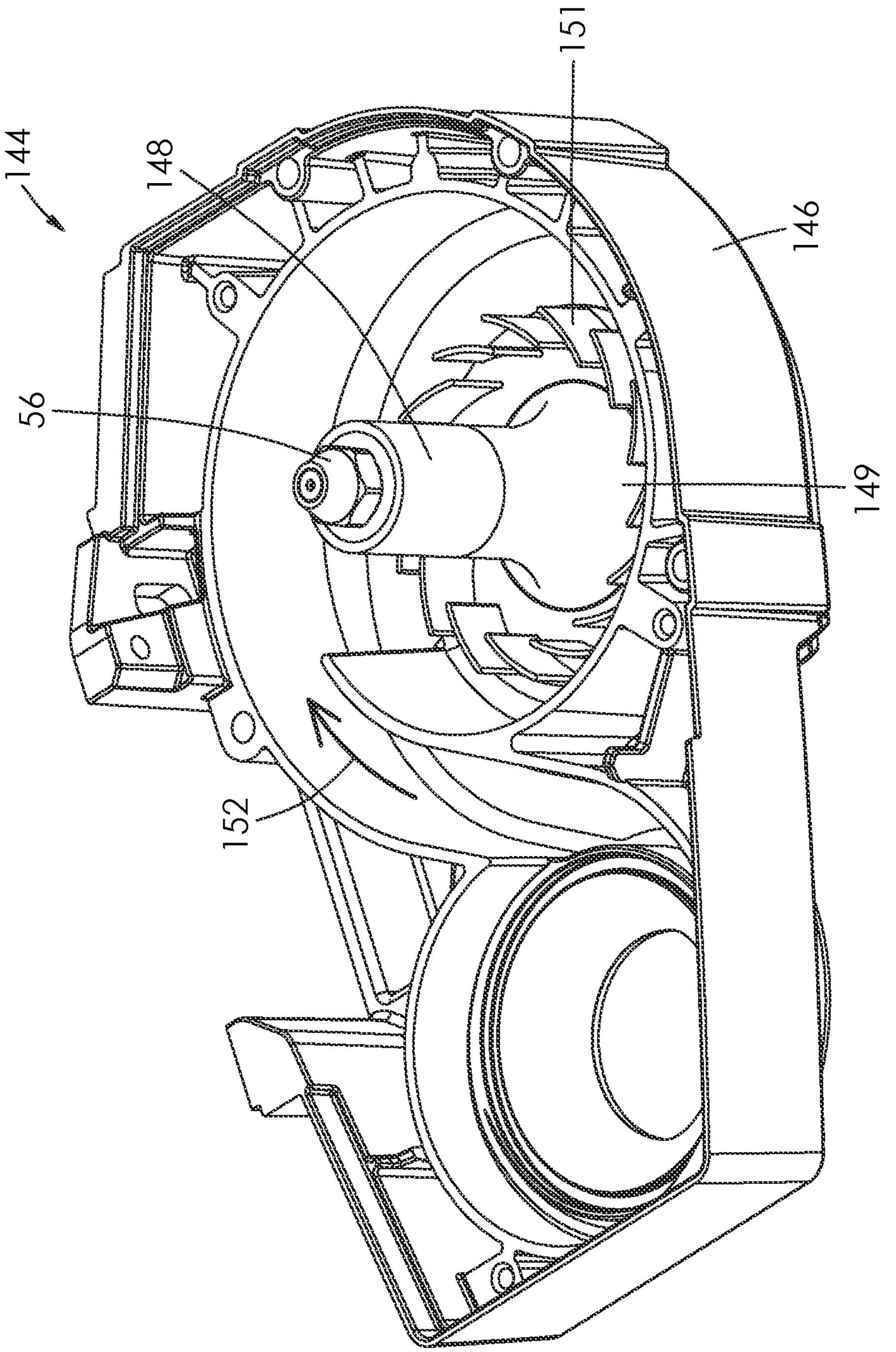
FIG. 21 is a perspective view of the fan assembly showing another air swirler thereof.
Figure 22:
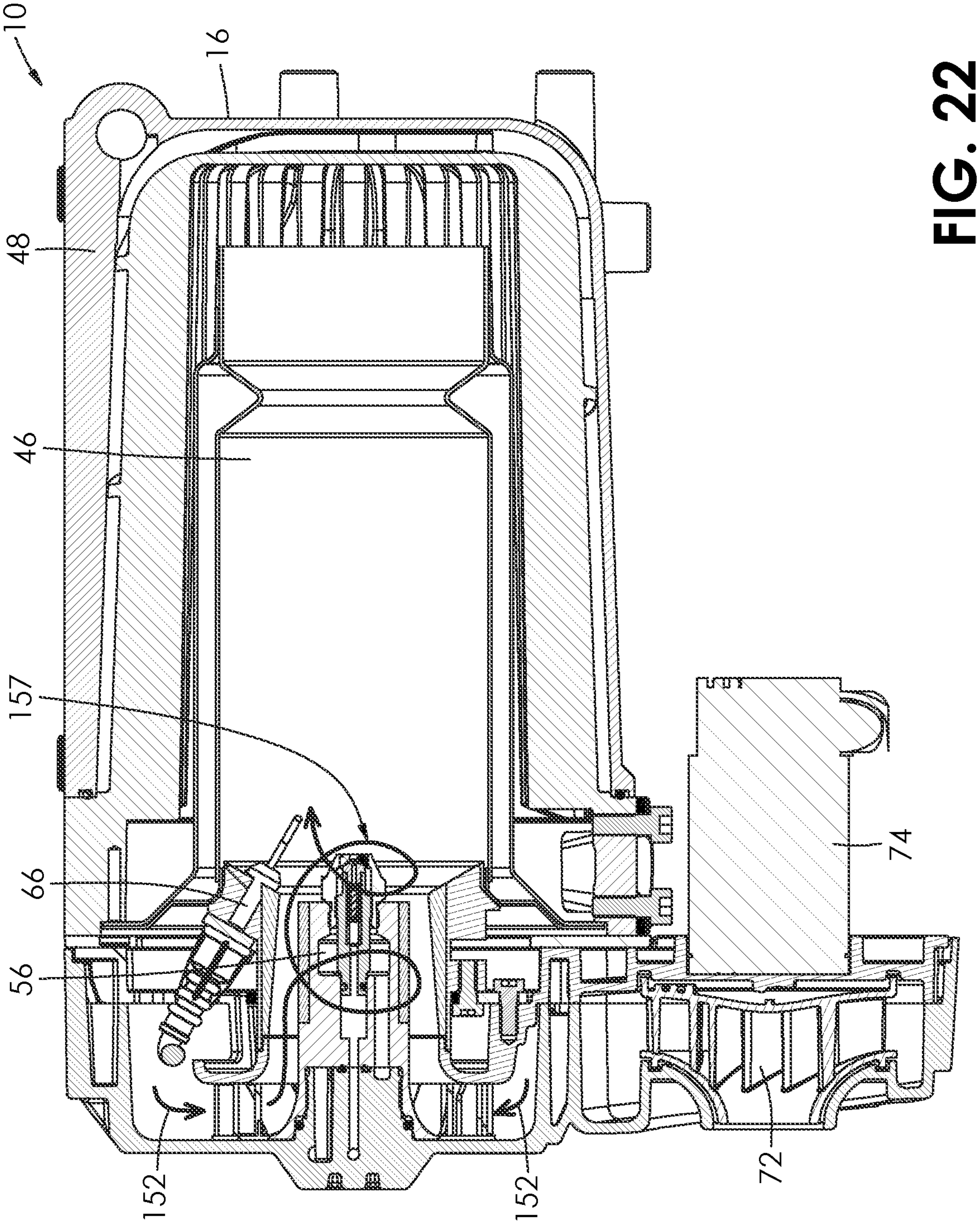
FIG. 22 is a side cross-sectional view of the heater of FIG. 1 showing the flow of combustion air through the air swirler of FIG. 21.

FIG. 21 shows another air swirler 151 which may be used in the fan assembly 144. The air swirler 151 is not mounted on the cylindrical sleeve 148. Instead, the air swirler 151 is located near a base 149 of the sleeve 148. The air swirler 151 has fins which extend upwardly from the base 149 of the sleeve 148. The air swirler 151 is similarly located in the path of the combustion air supply indicated by arrow 152 and forces the combustion air to swirl as indicated by arrow 157 prior to entry into the combustion chamber 46 as shown in FIG. 22.

Figure 23:
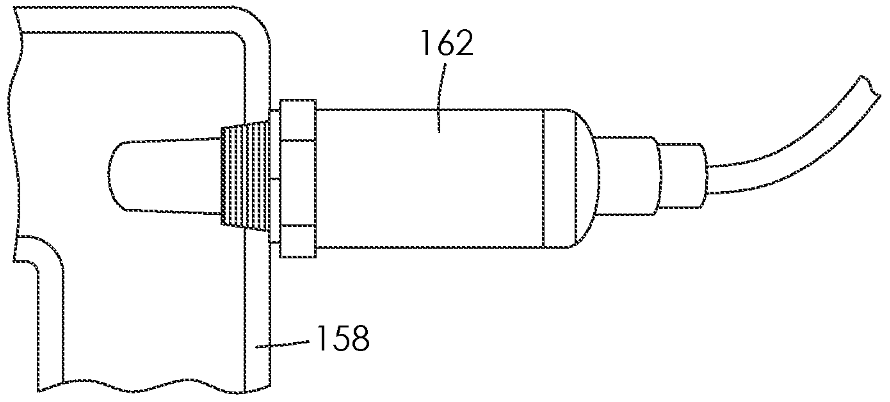
FIG. 23 is an enlarged, fragmentary side view showing a portion of an exhaust conduit of the heater of FIG. 1 and an oxygen sensor thereof.

Referring back to FIG. 2, the exhaust system 36 includes an exhaust conduit 158 which is connected to the heater exchanger 16 by a flange 160 which is shown in FIG. 7. Typically, the exhaust conduit 158 is connected to the exhaust of the vehicle via an exhaust pipe. There is an oxygen sensor 162 connected to the exhaust conduit 158 as best shown in FIG. 2. The oxygen sensor 162 is also operatively connected to the controller 26 which is shown in FIG. 3. The oxygen sensor 162 measures the oxygen content of exhaust gases from the heater 10, thereby providing an indication of the air/fuel ratio and the status of the combustion process. FIG. 23 shows the oxygen sensor 162 and the exhaust conduit 158 in greater detail.

Figure 24:
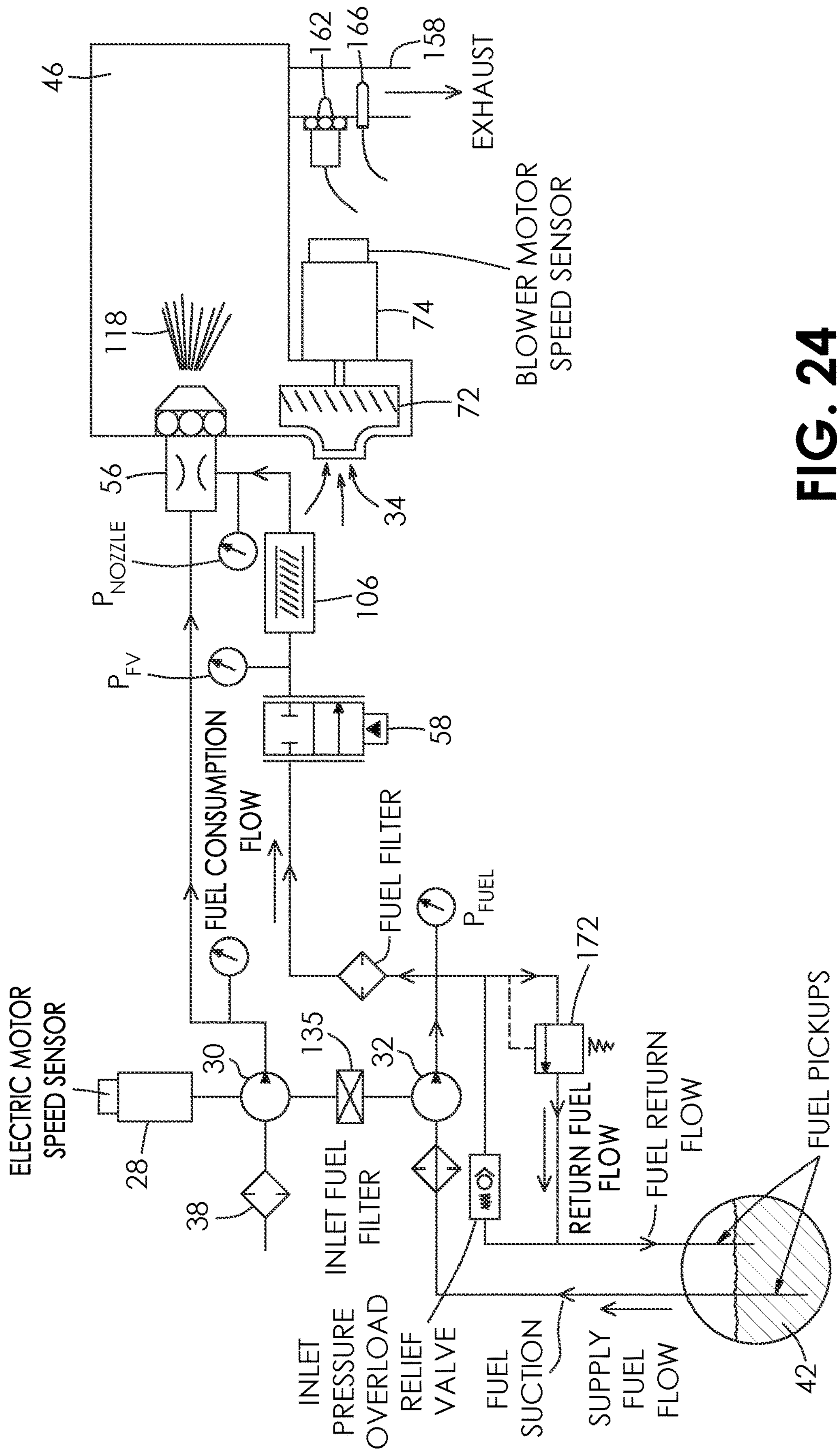
FIG. 24 is a schematic diagram of fuel, exhaust and combustion air components of the heater of FIG. 1.
Figure 25:
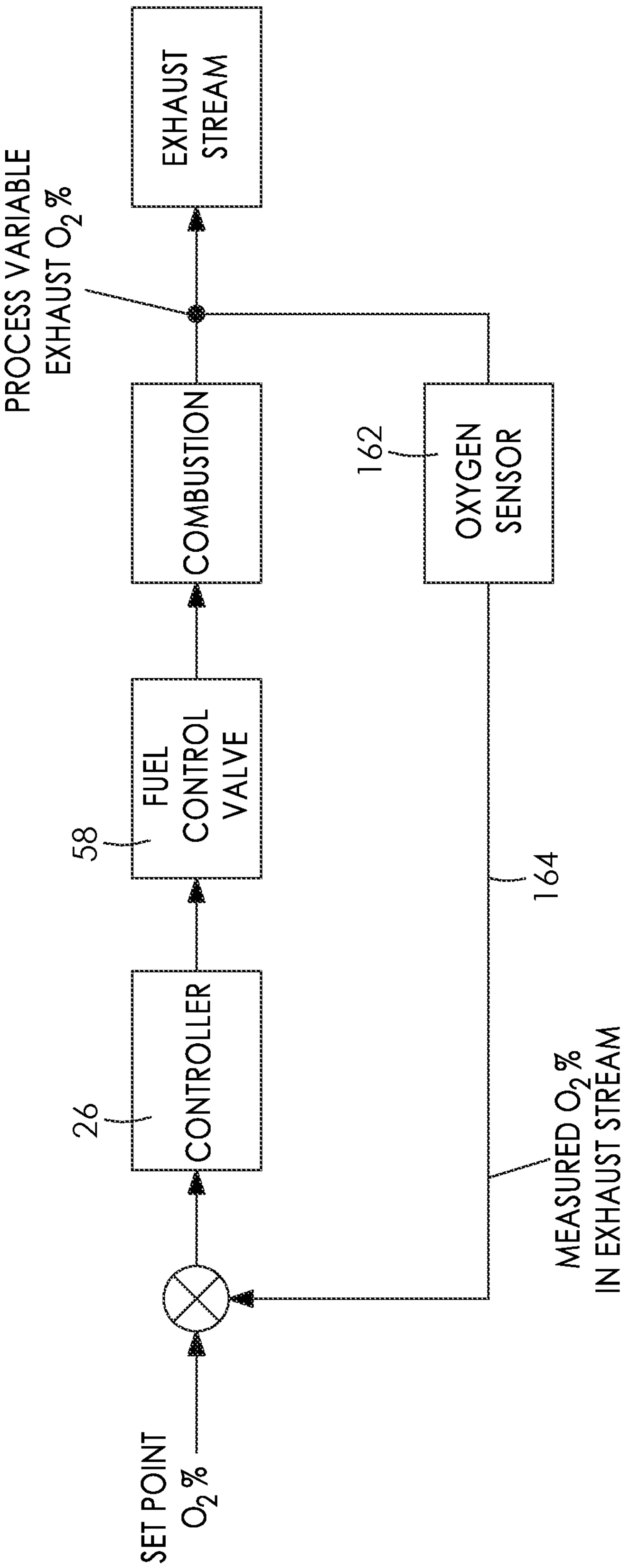
FIG. 25 is a schematic diagram of a closed loop control system of the heater of FIG. 1.

FIG. 24 shows the fuel control system for the heater 10. The fuel control system is a closed loop fuel control system based on feedback from the oxygen sensor 162. As shown in FIG. 25, feedback 164 from the oxygen sensor 162 to the controller 26 is used to control the fuel control valve, which in this example is the proportional control valve 58. In this way, the fuel delivery rate to the heater is modulated in response to the control loop. The proportional control valve 58, together with the fuel pump 32, provides continuously variable heat output. This is in contrast to conventional stepped control for heat output. Variable heat output control allows power consumption to be optimized.

The closed loop fuel control system allows the heat output from the heater 10 to be reduced or turned down while maintaining a preset stoichiometry throughout the turndown range. To reduce the heat output, the controller 26 reduces the speed of the blower motor 74 which results in a corresponding reduction in the oxygen level in the exhaust stream. To maintain the preset stoichiometry, the controller 26 then adjusts the proportional control valve 58 to reduce the fuel rate. Reducing the fuel rate in turn causes the oxygen level in the exhaust stream to increase until the target oxygen level set point is reached. The closed loop fuel control system also automatically maintains stoichiometry in situations where the air intake 34 or the exhaust conduit 158 are restricted.

A speed sensor is integrated into the electric motor 28 common to the air compressor 30 and the fuel pump 32. The blower motor 42 is also provided with a speed sensor. The electric motor 28 and the blower motor 74 are designed to operate specific speeds associated with specific heater output levels. As the heater output is reduced in accordance with the closed loop fuel control strategy or a lower desired output is required, the motor speeds are adjusted accordingly based on the defined lookup table set out below.

| Heat Output Setting | 10% | 20% | 30% | 40% | 50% | 60% | 70% | 80% | 90% | 100% |
|---|---|---|---|---|---|---|---|---|---|---|
| Blower Speed (rpm) | 1200 | 1667 | 2133 | 2600 | 3067 | 3533 | 4000 | 4467 | 4933 | 5400 |
| Compressor Speed (rpm) | 1500 | 1589 | 1678 | 1767 | 1856 | 1944 | 2033 | 2122 | 2211 | 2300 |

The heater 10 is designed to operate on voltages of 10 to 30 volts where the motors are nominally rated at 10 volts. As the heater 10 supply voltage fluctuates throughout the supply nominal operating range, a closed loop speed control adjusts the motor speed to follow the required speeds defined in the above lookup table and the desired heater output setting.

The closed loop fuel control system further maintains combustion stoichiometry and resulting exhaust emissions as the operating altitude of the heater increases. As altitude increases, the air density decreases and the performance of the blower 72 and the air compressor 30 are reduced proportionally. If the fuel rate is not adjusted as the altitude increases, and resultant air flow decreases, the oxygen level in the exhaust gases will decrease and the carbon monoxide content in the exhaust gases will increase. To compensate for the reduced air density, the controller 26 reduces the fuel rate proportionally to maintain the specified stoichiometry or preset oxygen level target.

The heat output of the heater 10 is also automatically adjusted to match the ability of the vehicle coolant system to accept the generated heat. The amount of generated heat that can be transferred to the coolant is proportional to the flow rate of the coolant. If the coolant flow rate is too low, then the coolant cannot absorb all of the heat generated and the temperature rises quickly to the heater cycle off temperature and the heater cycles off. The coolant continues to circulate and because the heating cycle is very short, the coolant is only heated locally within the heat exchanger. The balance of the unheated coolant continues to circulate through the system, resulting in the unheated coolant flowing into the heater. The system temperature sensor measures the low coolant temperature and signals the heater to restart and another heating cycle begins. This frequent start/stop cycle is called short cycling. In this situation, the load never gets warm.

To prevent short cycling, the closed loop fuel control system utilizes its turndown capability to vary the heater output. As shown in FIGS. 6 and 7, the heater 10 is provided with temperature sensors 168 and 170. When the temperature sensors 168 and 170 signal a call for heat, the heater 10 initiates a heating cycle. If the heater output is less than the heating load, the heater will run continuously or until it is shut off as it will never reach the cycle off temperature. If the heating load is less than the heater output, the heater will operate at 100% output until it reaches the cycle off temperature. The control strategy dictates that the heater must run for a minimum of ten minutes after the cycle is initiated. If the elapsed cycle time is less than ten minutes, the heater will start to reduce the heat output. A PID control loop will modulate the heater output using the closed loop fuel control to maintain the coolant temperature at the cycle off temperature for the balance of the ten-minute cycle interval. At the end of the ten minutes, the heater will cycle off.

The objective of this strategy is to prevent short cycling to ensure that the maximum amount of heat can be transferred to the load. This also ensures that the heater is operated for a period of time that is sufficient to heat up the burner components and burn off fuel and combustion residue, minimizing carbon deposits inside the combustion chamber.

The heater output can be coupled to a feedback system based on an external heat exchanger to maintain a specific temperature within the heated space. Based on information supplied from the load, the heater can automatically adjust itself to maintain a desired temperature change in the system. Large temperature variations in heating systems can be considered uncomfortable. The more consistent and steady the heat, the more comfortable it can be.

Figure 26:
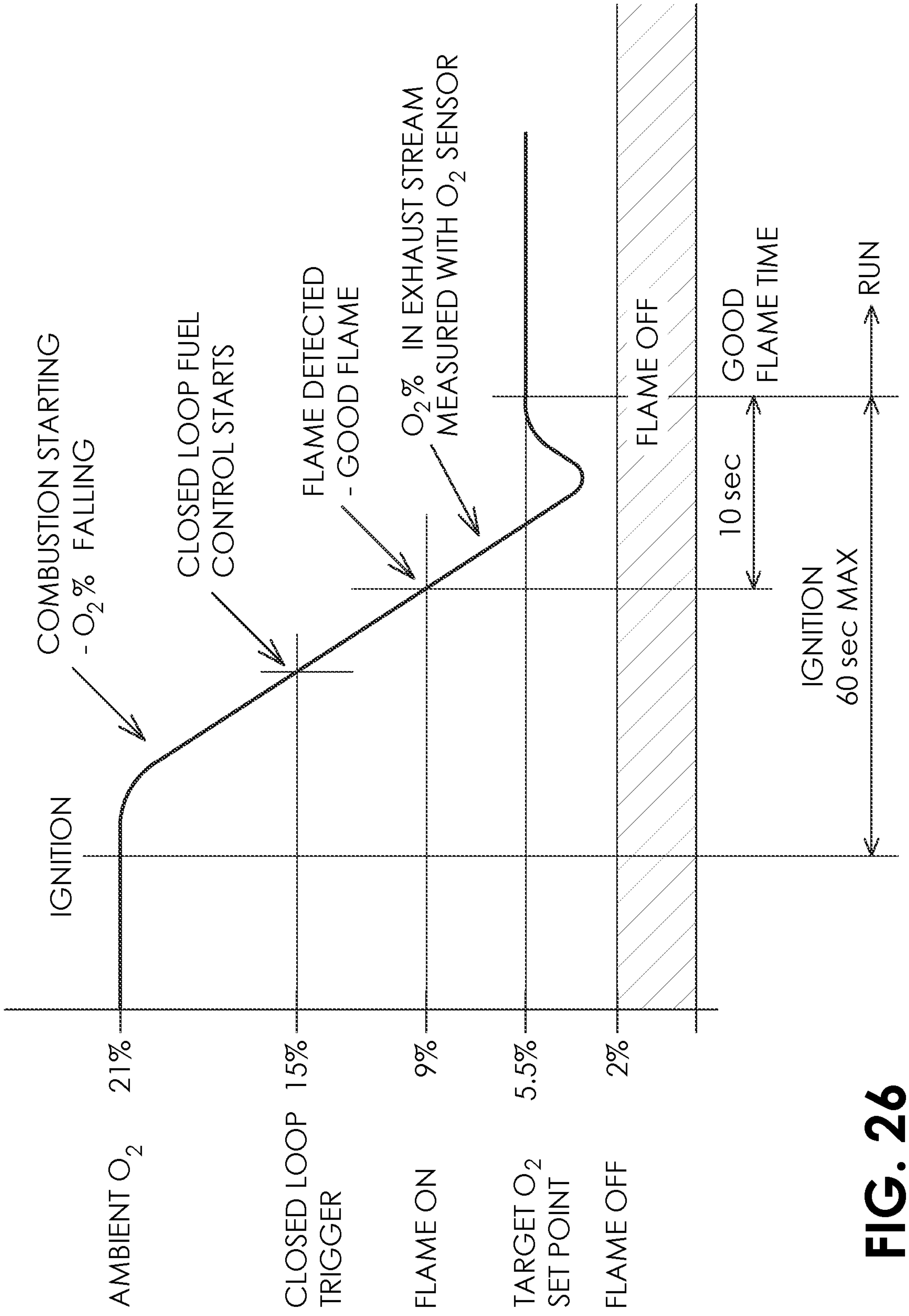
FIG. 26 is a graph of a flame detection system of the heater of FIG. 1.

The oxygen sensor 162 has a secondary function as a flame detection device. In particular, the oxygen sensor 162 measures the oxygen level in the exhaust stream to determine if a flame is present in the combustion chamber 46. As shown in FIG. 26 during start-up and operation of the heater 10, the level of oxygen in the exhaust stream as measured by the oxygen sensor 162 must reach prescribed limits and be maintained within the prescribed limits to indicate that a suitable flame is present in the combustion chamber 46. If a suitable or "good" flame is detected, the heater 10 will continue to operate. If a good flame is not detected, then the controller 26 will shut down the heater 10.

However, there are situations in which the oxygen sensor 162 may indicate that a flame is present in the combustion chamber 46 when there is no flame. For example, if the flame does not immediately ignite during ignition, fuel will continue to spray into the combustion chamber and saturate the oxygen sensor 162 with unburned fuel. This may cause the oxygen sensor 162 to potentially indicate a flame where none is present.

Figure 27:
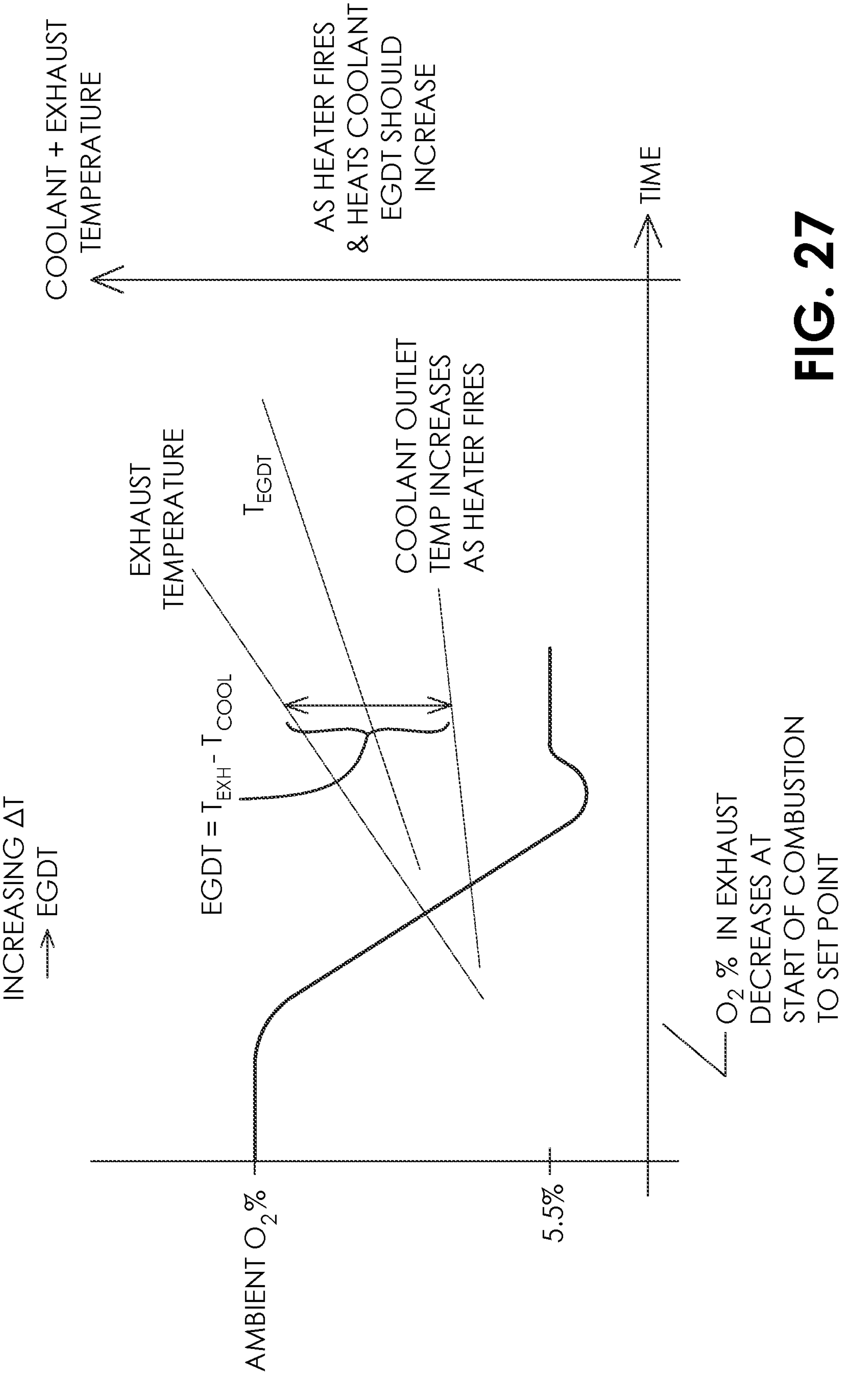
FIG. 27 is another graph of the flame detection system of the heater of FIG. 1.

To overcome this problem, secondary heater performance parameters, for example, exhaust gas temperature and coolant outlet temperature, are resolved into a parameter called the EGDT which is monitored concurrently with the oxygen sensor 162 data. The exhaust gas temperature may be measured by a temperature sensor 166 shown in FIG. 24. Referring now to FIG. 27, if a flame is present in the combustion chamber 46 during ignition or operation of the heater 10, the EGDT parameter is expected to rise or remain above prescribed levels. If a good flame is established at the start of combustion, the oxygen level will decrease while the EGDT value will increase. In cases where the oxygen sensor 162 is being deceived as to the presence of a flame, the oxygen level may decrease as normal but the EGDT will not increase, indicating a failure in flame detection and causing the controller 26 to indicate a fault. The concurrent monitoring of the EGDT parameter provides a secondary validation of the oxygen level reading in the exhaust stream confirming that a flame is present in the combustion chamber 46.

The heater 10 may also be provided with a backup flame detection system in the form of coolant temperature sensors 168 and 170 which are mounted on the coolant jacket 48 in spaced-apart locations as shown in FIGS. 6 and 7. The temperature sensors 168 and 170 measure the temperature of the coolant at two separate locations and compares the difference in temperature to a model of the theoretical temperature difference. If the measured temperature difference is outside of the range, then this may signal the lack of a flame. For example, the temperature sensor 168 may measure the temperature of inlet coolant while the temperature sensor 170 may measure the temperature of outlet coolant. The controller 26 senses a rise in the temperature difference between the inlet temperature sensor 168 and the outlet temperature sensor 170 and compares it to a running average of the temperature differences. The system compares the difference between the inlet and outlet coolant temperatures and the running average of the temperature differences. Depending upon the sign (+/−) of the comparison, the system can detect if a flame of the heater just came on or if it went out.

Figure 28:
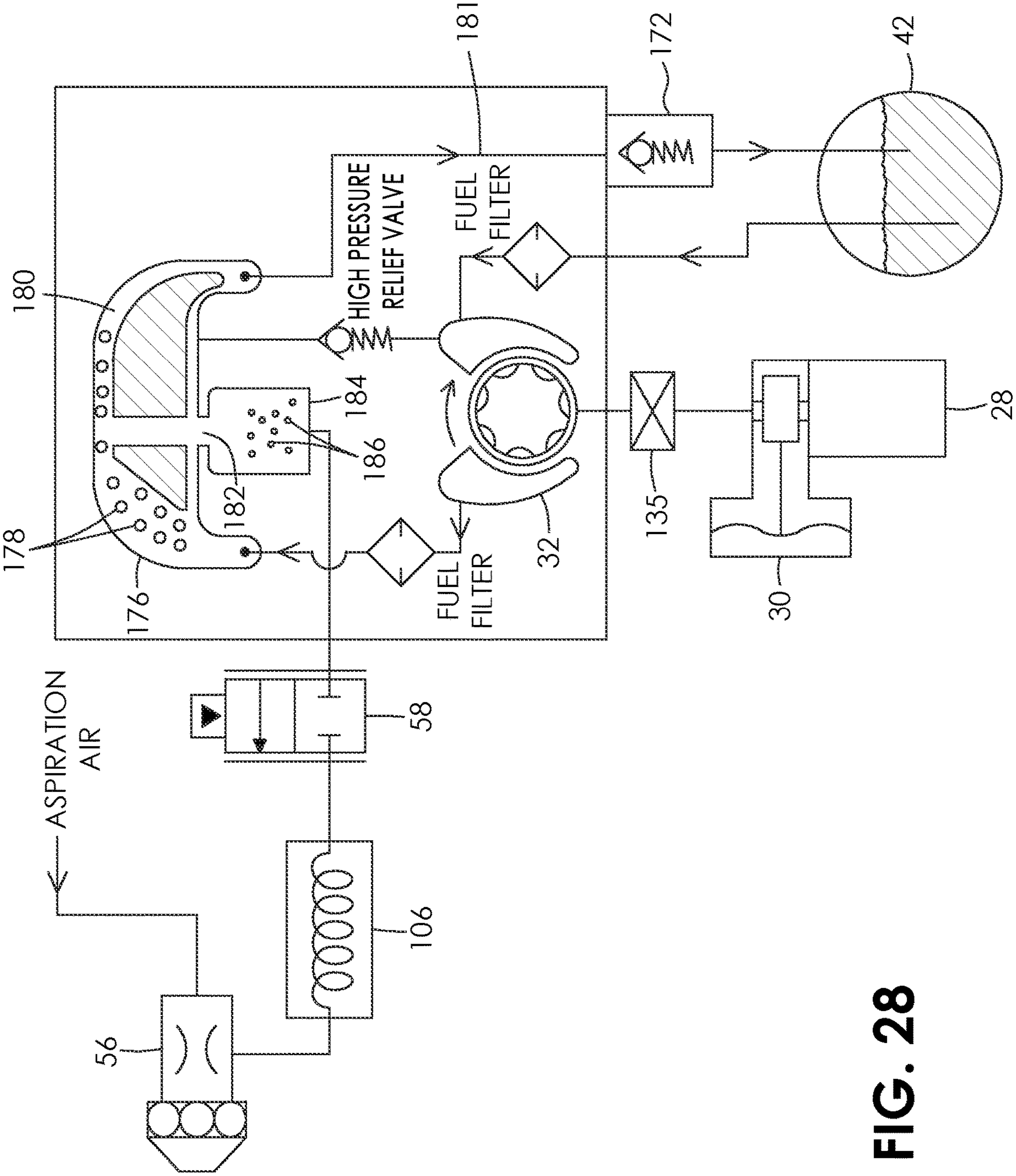
FIG. 28 is a schematic diagram of a fuel delivery system of the heater of FIG. 1.

Referring now to FIG. 28, the fuel delivery system of the heater 10 is shown. A pressure relief valve 172 is used to establish the fuel system operating pressure. At maximum heater output, approximately 85% to 90% of the total fuel flow returns to the fuel tank 42 over the relief valve 172. The balance of the total fuel flow (approximately 10% to 15%) is ported through the proportional control valve 58 and consumed in the combustion chamber 46 to generate heat. As the system operates, fuel delivered from the fuel pump 32 passes into a separation chamber 176. This allows large gas bubbles 178 entrained or suspended in the fuel to float up to the top of the chamber 176. There is a narrow fuel passage 180 near the top of the chamber 176. The narrow size of the fuel passage 180 increases the velocity of the fuel through the passage 180. The gas bubbles 178 are carried away in the passage 180 through the relief valve 172 to the fuel tank 42 in the return line 181.

There is also a narrow passage 182 located at the base of the chamber 176 which leads to a secondary chamber 184. Larger gas bubbles such as the gas bubbles 178 are restricted from entering the secondary chamber 184 due to the narrow size of the passage 182. Fuel flowing into the secondary chamber 184 is at the fuel burn rate which is significantly lower than the total fuel rate through the system. The velocity of the fuel is further reduced as it enters the secondary chamber 184. This lowered velocity increases the residence time of the fuel in the secondary chamber 184, allowing any remaining gas bubbles 186 to float up into the passage 180 and be returned to the fuel tank 42 in the return line 181. Fuel leaving the secondary chamber 184 is metered through the proportional control valve 58 to the atomizing nozzle 56.

Figure 29:
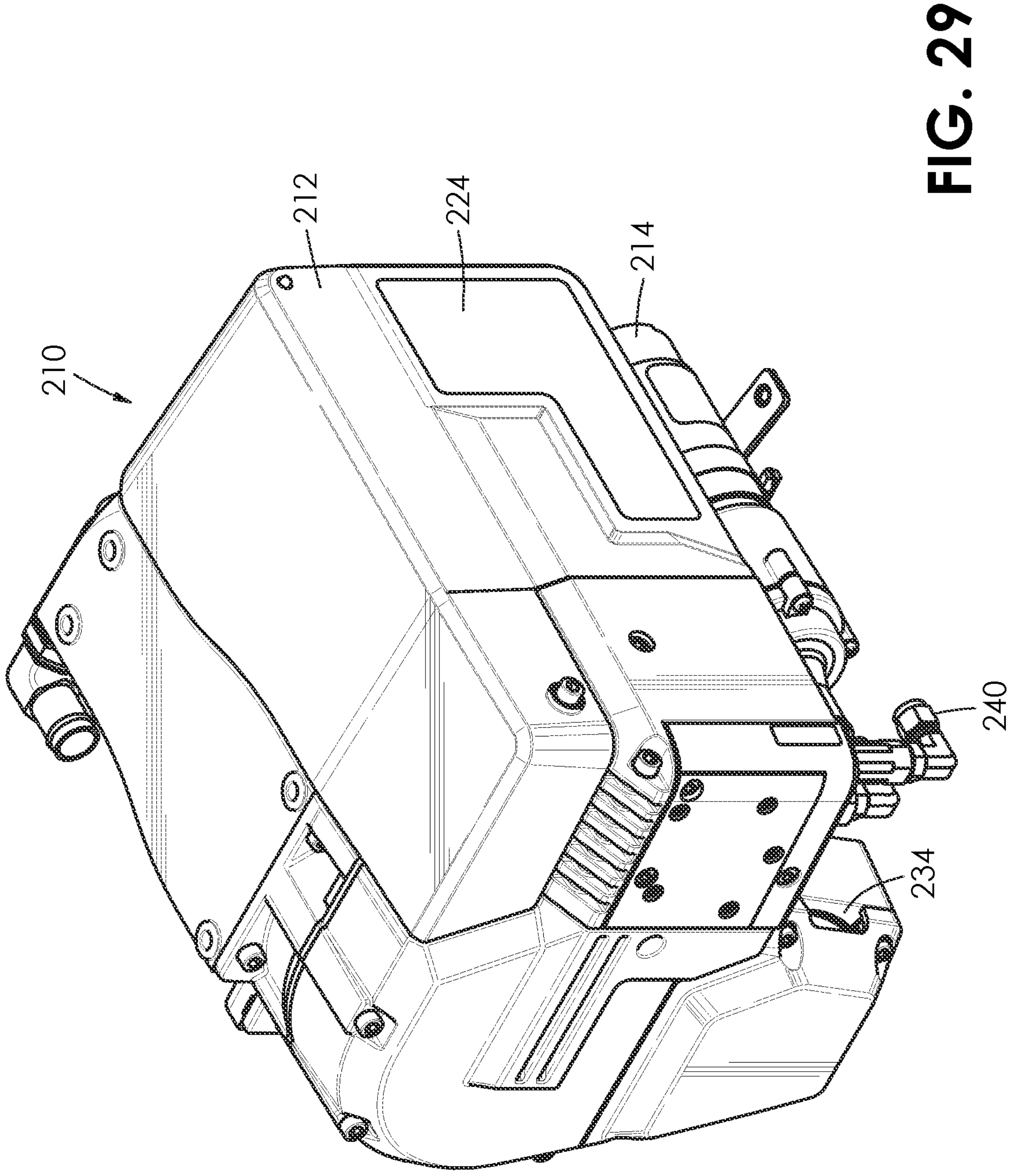
FIG. 29 is a front, top perspective view of another vehicle heater.
Figure 30:
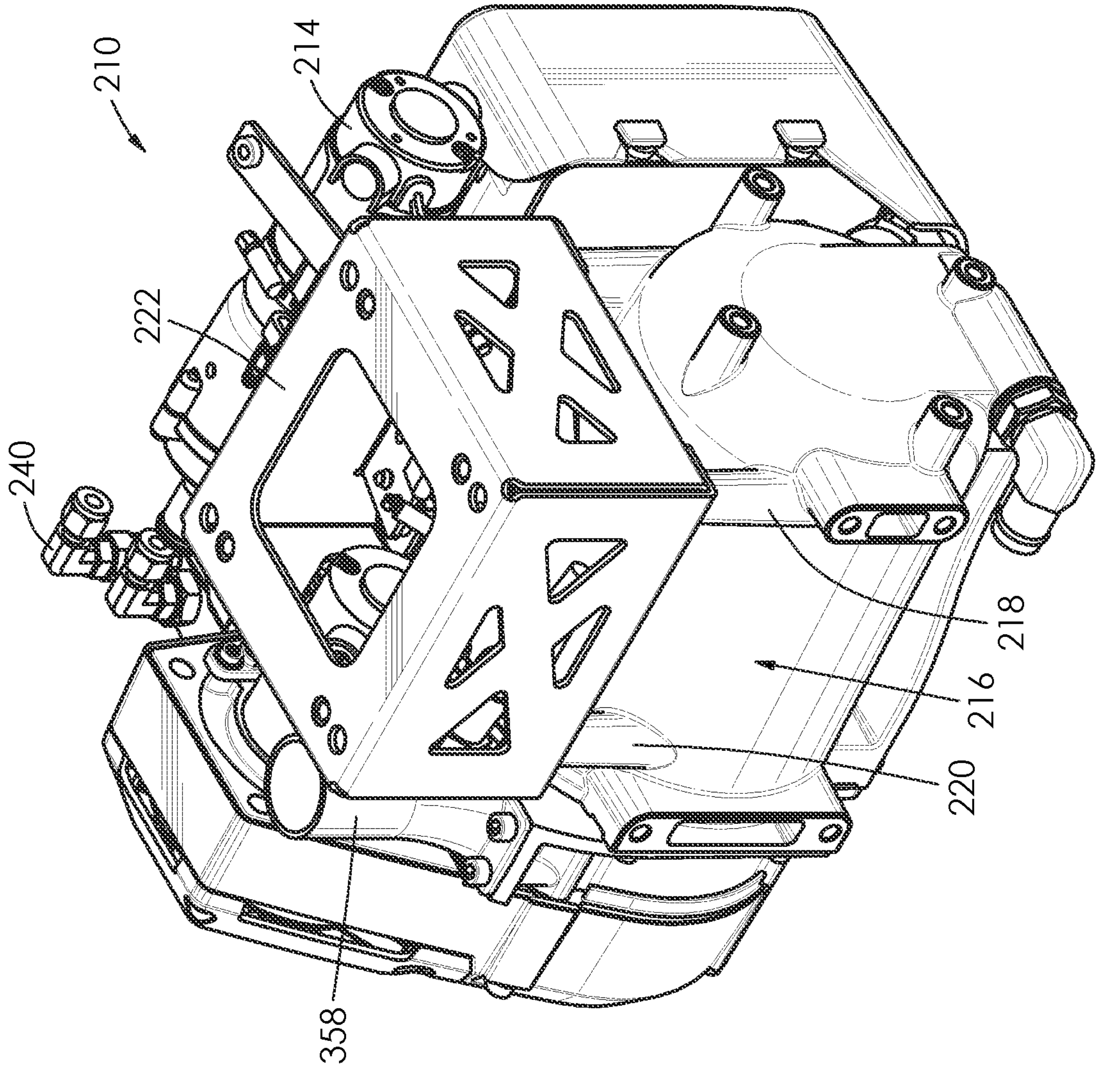
FIG. 30 is a rear, bottom perspective view of the heater of FIG. 29.

FIGS. 29 and 30 show another vehicle heater 210. Like parts have like numbers and functions as the vehicle heater 10 described above and shown in FIGS. 1 to 28 with the addition of "200".

It will be understood by a person skilled in the art that many of the details provided above are by way of example only, and are not intended to limit the scope of the invention which is to be determined with reference to the following claims.

What is claimed is:

1. A heater for a liquid, the heater comprising:
a fuel-delivery system including a fuel pump;
a burner operable to receive fuel from the fuel delivery system and to heat the liquid in response to combustion of the fuel; and
a control system operable to control at least one of the fuel delivery system and the burner by, at least:
in response to the liquid having at least a predetermined cycle-off temperature before expiry of a predetermined minimum period of time since the burner most recently began heating the liquid, causing the burner to continue heating the liquid; and
in response to the liquid having at least the predetermined cycle-off temperature after expiry of the predetermined minimum period of time since the burner most recently began heating the liquid, causing the burner to cease heating the liquid.

2. The heater of claim 1, wherein the predetermined minimum period of time is ten minutes.

3. The heater of claim 1, wherein the control system is further operable to control at least the fuel delivery system and the burner by, at least, in response to the liquid having at least the predetermined cycle-off temperature before expiry of the predetermined minimum period of time since the burner most recently began heating the liquid, controlling heat output of the burner to maintain the liquid at the predetermined cycle-off temperature.

4. The heater of claim 1, further comprising a combustion chamber, wherein:
the burner comprises a nozzle connected to the fuel delivery system to receive fuel from the fuel delivery system; and
the nozzle is operable to receive compressed air and to utilize the compressed air to deliver an atomized spray of the fuel into the combustion chamber.

5. The heater of claim 4, wherein the control system is further operable to control at least a pressure of the compressed air independently of a fuel delivery rate of the fuel from the fuel delivery system to the nozzle.

6. The heater of claim 5, wherein the control system is operable to control the pressure of the compressed air at least according to a desired output level of the heater.

7. The heater of claim 4, further comprising an air compressor, wherein the nozzle is connected to the air compressor to receive the compressed air from the air compressor.

8. The heater of claim 7 wherein the air compressor has an electric drive motor operable to cause the air compressor to produce the compressed air in response to rotation of an output shaft of the electric drive motor, wherein the output shaft of the electric drive motor is rotationally coupled to the fuel pump by a magnetic coupling operable to transfer a torque from the output shaft of the electric drive motor to the fuel pump to power the fuel pump in response to the rotation of the output shaft of the electric drive motor.

9. The heater of claim 8, wherein the magnetic coupling includes:
a drive cup coupled to the output shaft of the electric drive motor of the air compressor for rotation in response to the rotation of the output shaft of the electric drive motor of the air compressor; and
a shaft follower within and magnetically coupled to the drive cup and connected to the fuel pump by a shaft such that the rotation of the output shaft of the electric drive motor powers the fuel pump.

10. The heater of claim 1, wherein the fuel-delivery system comprises a chamber positioned to receive the fuel before the fuel is received by the burner, and wherein the chamber is in fluid communication with a passage above the chamber to allow any gas bubbles in the chamber to float up into the passage.

11. The heater of claim 10, wherein a second passage is in a fluid-flow path between the chamber and the passage, and wherein the second passage has a smaller cross-sectional area than the chamber to cause the fuel flowing through the chamber to have a lower average velocity than the fuel flowing through the second passage.

12. The heater of claim 10, further comprising a fuel inlet, wherein:
the fuel pump is operable to pump, at least:
a first portion of the fuel from the fuel inlet into the chamber; and
a second portion, separate from the first portion, of the fuel from the fuel inlet into the passage; and
the passage is in fluid communication with the fuel inlet such that the passage is operable to carry the gas bubbles from the chamber to a fuel tank connected to the fuel inlet.

13. The heater of claim 12, wherein the fuel-delivery system further comprises a pressure-relief valve in a fluid-flow path between the passage and the fuel inlet and operable to maintain a pressure of the fuel in the chamber.

14. The heater of claim 10, wherein the fuel pump is positioned to receive the fuel from a fuel inlet and to pump, at least:
a first portion of the fuel from the fuel inlet into the chamber; and
a second portion, separate from the first portion, of the fuel from the fuel inlet into the passage.

15. The heater of claim 10, wherein the fuel-delivery system further comprises a proportional-control valve in a fluid-flow path between the chamber and the burner, wherein the control system is operable to control a fuel delivery rate of the fuel from the fuel delivery system to the burner via the proportional control valve.

16. The heater of claim 1, wherein:
the burner comprises a nozzle having an outlet and a disparager assembly;
the disparager assembly includes an outer barrel having a threaded inner wall portion and an inner rod having a threaded outer wall portion;
the threaded inner wall portion of the outer barrel and the threaded outer wall portion of the inner rod have different thread pitches and define a tortuous flow path on an outer side of the threaded outer wall portion of the inner rod;
the outer side of the threaded outer wall portion of the inner rod faces the threaded inner wall portion of the outer barrel;
the tortuous flow path is between the threaded inner wall portion of the outer barrel and the threaded outer wall portion of the inner rod; and
the tortuous flow path is positioned to convey the fuel from the fuel-delivery system to the outlet of the nozzle.

17. The heater of claim 1, further comprising:
a combustion chamber, the burner operable to cause combustion of the fuel in the combustion chamber; and
a jacket operable to receive the liquid, the jacket extending about the combustion chamber.

18. The heater of claim 1, further comprising:

a combustion chamber, the burner operable to cause combustion of the fuel in the combustion chamber; and a blower assembly having an output communicating with the combustion chamber, the blower assembly operable to provide combustion air to the combustion chamber.

19. The heater of claim 18, further comprising:

an exhaust system extending from the combustion chamber and operable to discharge, from the heater, exhaust gases produced by combustion in the combustion chamber; and an oxygen sensor positioned in the exhaust system and operable to detect oxygen content of the exhaust gases; and wherein the control system is operatively coupled to the oxygen sensor, the blower assembly, and the fuel delivery system, and wherein the control system is operable to control at least:

a variable combustion air delivery rate of the combustion air from the blower assembly according to a desired heat output level of the heater and independently of the oxygen content of the exhaust gases, the desired heat output level selected from a plurality of different selectable heat output levels of the heater; and a variable fuel delivery rate of the fuel delivery system according to the oxygen content of the exhaust gases.

20. The heater of claim 19, wherein:

the blower assembly comprises a blower and a blower motor operable to power the blower; and the control system is operable to control at least a speed of the blower motor according to the desired output level of the heater and independently of the oxygen content of the exhaust gases.

* * * * *